United States Patent
Caufield et al.

(10) Patent No.: US 9,262,210 B2
(45) Date of Patent: Feb. 16, 2016

(54) LIGHT WEIGHT WORKLOAD MANAGEMENT SERVER INTEGRATION

(75) Inventors: Brian K. Caufield, Livermore, CA (US); Yong Li, Newton, MA (US); Xiaoyan Pu, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/538,854

(22) Filed: Jun. 29, 2012

(65) Prior Publication Data

US 2014/0007121 A1    Jan. 2, 2014

(51) Int. Cl.
G06F 9/46 (2006.01)
G06F 9/48 (2006.01)
G06F 9/50 (2006.01)

(52) U.S. Cl.
CPC .............. *G06F 9/4843* (2013.01); *G06F 9/505* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 6,772,407 B1 | 8/2004 | Leymann et al. | |
| 7,720,804 B2 | 5/2010 | Fazal et al. | |
| 7,904,894 B2 * | 3/2011 | Entin et al. | 717/151 |
| 8,245,238 B2 | 8/2012 | Neubauer et al. | |
| 2005/0015504 A1 * | 1/2005 | Dorne et al. | 709/229 |
| 2007/0276951 A1 * | 11/2007 | Riggs et al. | 709/229 |
| 2009/0313631 A1 | 12/2009 | De Marzo et al. | |
| 2012/0102007 A1 | 4/2012 | Ramasubramanian et al. | |
| 2012/0167112 A1 | 6/2012 | Harris et al. | |
| 2012/0260256 A1 * | 10/2012 | De Faria et al. | 718/103 |

OTHER PUBLICATIONS

U.S. Appl. No. 13/959,210, filed Aug. 5, 2013, entitled "Multiple Stage Workload Management System", invented by Brian K Caufield et al., Total 37 pp. (57.315).

Alur, N., A. Corrente, R.D. Johnston, and S. Toratani, "Deploying a Grid Solution with the IBM InfoSphere Information Server", Redbooks, IBM, Sep. 2008, Total 348 pp. (Also available at http://www.redbooks.ibm.com/redbooks/pdfs/sg247625.pdf.).

Configuration Management Inc., "Ab Initio", [online], [Retrieved on May 16, 2012]. Retrieved from the Internet at: URL: <http://www.cmi.com/index.php/technology-solutions/tech-sol-overview/ab-initio>, 2011 Configuration Management, Inc., Total 4 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

* cited by examiner

*Primary Examiner* — Emerson Puente
*Assistant Examiner* — Zhi Chen
(74) *Attorney, Agent, or Firm* — Janaki K. Davda; Konrad, Raynes, Davda & Victor LLP

(57) ABSTRACT

A method, computer program product and system for workload management for an Extract, Transform, and Load (ETL) system. A priority of each workload in a set of workloads is determined using a priority rule. In response to determining that the priority of a workload to be checked has a highest priority, it is indicated that the workload has the highest priority. It is determined whether at least one logical resource representing an ETL metric is available for executing the workload. In response to determining that the workload has the highest priority and that the at least one logical resource is available, it is determined that the workload is runnable.

24 Claims, 40 Drawing Sheets

```
<Classes>
    <Class name="LowPriorityClass" policy="NormalPolicy" default="true"/>
    <Class name="HighPriorityClass" policy="AdminPolicy" default="false"/>
</Classes>
<Resources>
    <Resource name="WorkloadCount" value="20"/>
</Resources>
<Policies>
    <Policy name="NormalPolicy">
        <Allocation resource="WorkloadCount" percent="20">
            <Distribution LowPriorityClass="40" HighPriorityClass="60"/>
        </Allocation>
    </Policy>
</Policies>
```

```
-- Begin Workload
BeginWorkload
beginWorkload -pid <pid> -wl | -workload <workload> -cn |
-className <workloadClassName> -projectName
<projectName> -workloadName <workloadName> -type <px/server> -
workloadDescription <description>
        Begin the given workload and assign it to the
default workload class.
beginWorkload -pid <pid> -cn | -className
<workloadClassName> -wl | -workload <workload>
        Begin the given workload and assign it to the
given workload class.

-- Submit Workload
SubmitWorkload
submitWorkload -pid <pid> -wl | -workload <workload> -cn |
-className <workloadClassName> -projectName
<projectName> -workloadName <workloadName> -type <px/server> -
workloadDescription <description>
        Submit the given workload and assign it to the
default workload class.
submitWorkload -cn | -className <workloadClassName> -wl |
workload <workload>
        Submit the given workload and assign it to the
given workload class.

-- Check Workload
CheckWorkload
checkWorkload -pid <pid> -id <workloadID>
        Checks with the server to see if there are enough
resources to run the given workload.

-- End Workload
EndWorkload
endWorkload -id <workloadID>
        Ends the currently running workload with the
given id and releases the resources.
```

```
-- List
List
listAll
        lists all active and pending workloads.
listActive
        lists all active workloads.
listPending
        lists all pending workloads.
listClass -cn | -className <workloadClassName>
        lists all pending and active workloads in the
given workload class.
listClasses
        lists all workload classes defined in the config
file.

-- Report
Report
reportWorkload -wl | workload <workloadID>
        Generates report for the given workload ID.
reportSystem
        Generates a system report.

-- Move
Move
move -id <workloadID; | workladID; workloadID; ...> -
position <top/bottom> -cn | -className
<workloadClassName>
        Moves the given workload or workloads to the top
or bottom of the given workload class queue.
```

```
-- Remove
Remove
remove -id <workloadID; | workloadID;workloadID...>
        Removes the given workload from its class queue.
removeForce -id <workloadID>
        Removes the given workload from its class queue.
Will remove it from the active queue if it is
running.
removeClass -cn | -className <workloadClassName>
        Removes all pending workloads from the given
class queue.
removeAll
        Removes all pending workloads from all class
queues.

-- Pause
Pause
pause
        Pauses the system in both directions. The user
will not be able to submit/begin workloads and the
server will not be able to execute workloads.
pauseIn
        Pauses the system in 'IN' directions. The user
will not be able to submit/begin any workload.
pauseOut
        Pauses the system in 'OUT' directions. The server
will not execute any workloads.

-- Resume
Resume
resume
        Resumes the system. The user will be able to
submit/begin workloads and the server will be able to
execute workloads.
```

```
-- Update
Update
update
        Reads the config file and updates the system if
there are no pending workloads
updateForce
        Clears all the pending workloads and then reads
the config file and updates the system -- Version
Version
version
        Displays the version of WLM.

-- Check
Check
checkStatus
        Checks if the WLM server is running.

checkClass -cn | -className <workloadClassName>
        Checks if the given workload class exists.

-- Get
Get
getDefault
        Gets the name of the default class.

getAverageClassQueuedTime -cn | -className
<workloadClassName>
        Gets the averaged queued time for the given
class.
getAverageSystemQueuedTime
        Gets the averaged queued time for the system.
getAverageQueuedTime
        Gets the averaged queued time for the system and
each class.
getConfig
        Gets the system configuration file.
```

```
-- Set
Set
setStartupTime -id <workloadID> -startupTime
<startupTime>
        Sets the time when the given workload was
actually started.

-- Save
Save
saveConfig
        Save the updated system configuration file.
        It supports the following commands and arguments:
        createClass -cn | -className <workloadClassName>
-priority <low/medium/high> -isDefault <true/false> -
workloadCount <value> -starWorkload <value> -timeFrame <value>;
        updateClass -cn | -className <workloadClassName>
-priority <low/medium/high> -isDefault <true/false> -
workloadCount <value> -starWorkload <value> -timeFrame <value>;
        deleteClass -cn | -className <workloadClassName>;
        updateSystemResource -workloadCount <value> -starWorkload
<value> -timeFrame <value>;
        updateSystemParameter -parameterName <value> [-
parameterName <value> ...];
        updatePriorityRule -ruleName <PriorityWeight/
WorkloadRunRatio/ElapsedTime> -Selected <true/false> | [-
highToMedium <ratio> -mediumToLow <ratio> for
WorkloadRunRatio] | [-maxTime <maxElapsedTime> for
ElapsedTime];
```

Active Workloads:

{"queuedTime":10.329,"className":"LowPriorityClass","projectName":"dstage1","submitTime":"3\/28\/12 3:21 PM","workloadName":"TestWorkload1","elapsedTime":18.672,"processID":7292,"startupTime":"'2012-03-28","runningTime":8.343,"workloadID":3411,"status":"RUNNING","parentWorkload":"dsworkload1","workloadType":"PX"}
{"queuedTime":8.141,"className":"LowPriorityClass","projectName":"dstage1","submitTime":"3\/28\/12 3:21 PM","workloadName":"TestWorkload2","elapsedTime":15.25,"processID":8804,"startupTime":"'2012-03-28","runningTime":7.109,"workloadID":3412,"status":"RUNNING","parentWorkload":"dsworkload1","workloadType":"PX"}
{"queuedTime":6.109,"className":"LowPriorityClass","projectName":"dstage1","submitTime":"3\/28\/12 3:21 PM","workloadName":"TestWorkload9","elapsedTime":11.187000000000001,"processID":5492,"startupTime":"'2012-03-28","runningTime":5.078,"workloadID":3413,"status":"RUNNING","parentWorkload":"dsworkload1","workloadType":"PX"}

```
Pending Workloads:

LowPriorityClass :
{"queuedTime":10.125,"className":"LowPriorityClass","
projectName":"dstage1","submitTime":"3\/28\/12 3:21
PM","workloadName":"TestWorkload3","elapsedTime":10.125,"proces
sID":7600,"startupTime
":null,"runningTime":0.0,"workloadID":3414,"status":"
QUEUED","parentWorkload":"dsworkload1","workloadType":"PX"}
{"queuedTime":7.203,"className":"LowPriorityClass","p
rojectName":"dstage1","submitTime":"3\/28\/12 3:21
PM","workloadName":"TestWorkload6","elapsedTime":7.203,"process
ID":8896,"startupTime":
null,"runningTime":0.0,"workloadID":3415,"status":"QU
EUED","parentWorkload":"dsworkload1","workloadType":"PX"}
{"queuedTime":5.328,"className":"LowPriorityClass","p
rojectName":"dstage1","submitTime":"3\/28\/12 3:21
PM","workloadName":"TestWorkload1M","elapsedTime":5.328,"proces
sID":4576,"startupTime"
:null,"runningTime":0.0,"workloadID":3416,"status":"Q
UEUED","parentWorkload":"dsworkload1","workloadType":"PX"}
{"queuedTime":3.796,"className":"LowPriorityClass","p
rojectName":"dstage1","submitTime":"3\/28\/12 3:21
PM","workloadName":"TestWorkload4","elapsedTime":3.796,"process
ID":5168,"startupTime":
null,"runningTime":0.0,"workloadID":3417,"status":"QU
EUED","parentWorkload":"dsworkload1","workloadType":"PX"}

HighPriorityClass : Empty

LowCPUClass : Empty

HighCPUClass : Empty

WISDClass : Empty

SmallUnreservedClass : Empty

LargeUnreservedClass : Empty
```

FIG. 20B

LIGHT WEIGHT WORKLOAD MANAGEMENT SERVER INTEGRATION

FIELD

Embodiments of the invention relate to light weight workload management server integration.

BACKGROUND

Data integration may be described as extracting data from a source, transforming the data, and loading the data to a target. That is, data integration is Extract, Transform, Load (ETL) processing. Data integration processing engines may be scalable and capable of processing large volumes of data in complex data integration projects. It is common for multiple users (e.g., customers) and projects to share a single data integration processing engine that is responsible for handling all of the data integration processing for those multiple users. This high volume, highly concurrent processing may be resource intensive, and users try to balance the availability of system resources with the need to process large volumes of data efficiently and concurrently.

Workload management capabilities may be available at Operating System (OS) or lower levels. Workload management operates at a level that is removed from the data integration environment.

Some users use a multi-node grid so that they can utilize a grid resource manager to better control system resources. The grid resource manager deploys data integration projects on a grid.

Some users use Symmetric Multiprocessing (SMP), which are multi-core, hyper-threaded systems for data integration.

Some users rely on workload schedulers to control workloads. This requires coordination between different groups or the same group running different projects.

SUMMARY

Provided are a method, computer program product, and system for workload management for an Extract, Transform, and Load (ETL) system. A priority of each workload in a set of workloads is determined using a priority rule. In response to determining that the priority of a workload to be checked has a highest priority, it is indicated that the workload has the highest priority. It is determined whether at least one logical resource representing an ETL metric is available for executing the workload. In response to determining that the workload has the highest priority and that the at least one logical resource is available, it is determined that the workload is runnable.

BRIEF DESCRIPTION OF THE SEVERAL VIEWS OF THE DRAWINGS

Referring now to the drawings in which like reference numbers represent corresponding parts throughout:

FIG. 2 illustrates an example snippet of a workload manager configuration file in accordance with certain embodiments.

FIG. 9 is formed by FIG. 9A and FIG. 9B.

FIG. 10 is formed by FIGS. 10A, 10B, and 10C.

FIG. 11 is formed by FIGS. 11A and 11B.

FIG. 13 is formed by FIGS. 13A and 13B.

FIG. 14 is formed by FIGS. 14A and 14B.

FIG. 15 is formed by FIG. 15A, FIG. 15B, FIG. 15C, FIG. 15D, and FIG. 15E.

FIG. 17 is formed by FIG. 17A and FIG. 17B.

FIG. 19 illustrates example command Application Programming Interfaces (APIs) that a client may send to the workload management server in accordance with certain embodiments. FIG. 19 is formed by FIG. 19A, FIG. 19B, FIG. 19C, FIG. 19D, and FIG. 19E.

FIG. 20 illustrates an example of output in accordance with certain embodiments. FIG. 20 is formed by FIG. 20A and FIG. 20B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
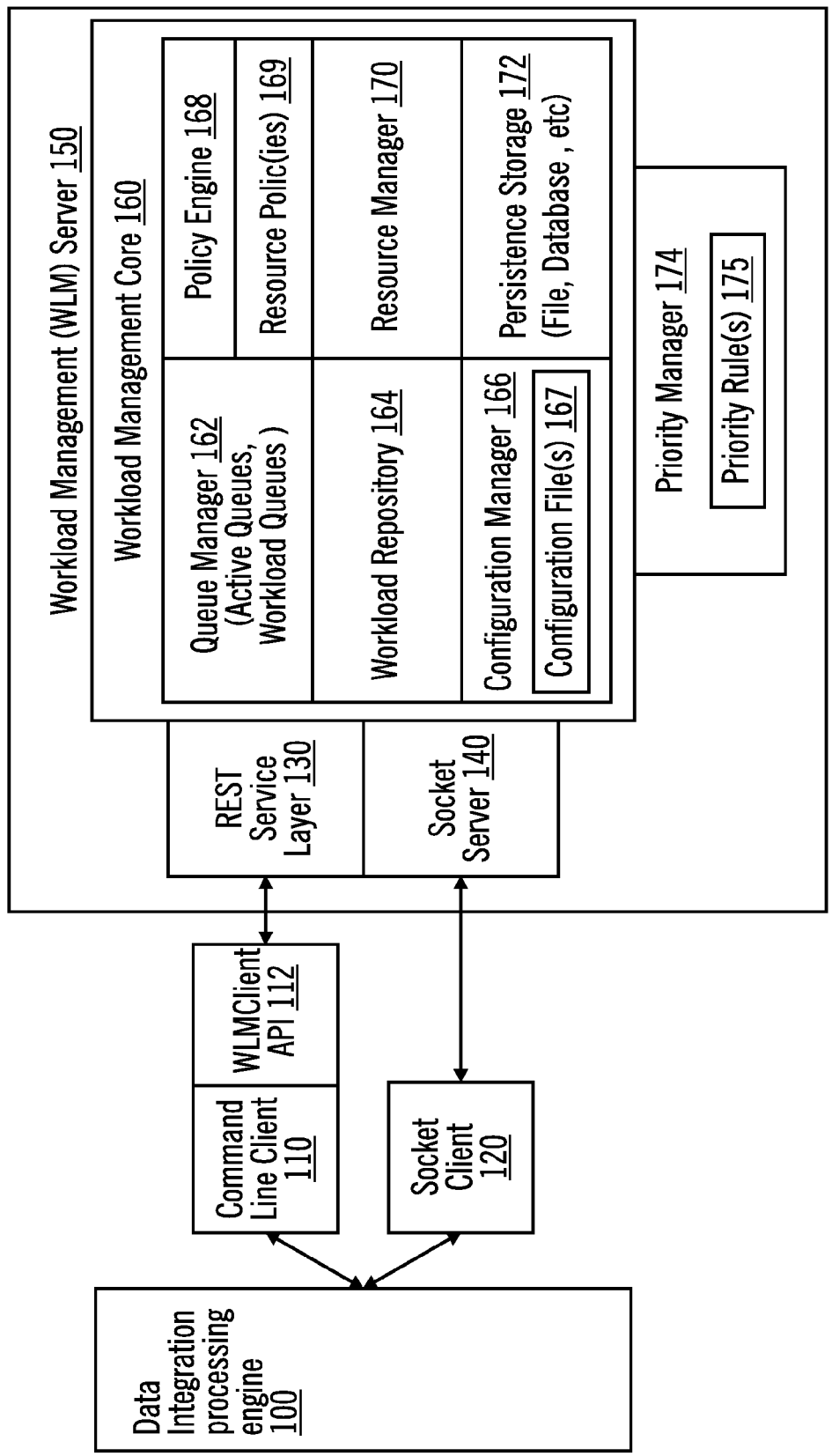
FIG. 1 illustrates a system architecture in accordance with certain embodiments.

FIG. 1 illustrates a system architecture in accordance with certain embodiments. In FIG. 1, a data integration processing engine 100 interacts with a workload management (WLM) server 150. The data integration processing engine 100 processes data integration workloads (i.e., ETL workloads), and the workload management server 150 allows management of these data integration workloads using ETL metrics. In certain embodiments, a workload is a job.

The workload management server 150 includes a Representational State Transfer (REST) service layer 130, a socket server 140, and a workload management (WLM) core 160.

The data integration processing engine 100 is coupled to a command line client 110/WLMClient Application Programming Interface (API) 112. The data integration processing engine 100 is also coupled to a socket client 120. The command line client 110/WLMClient API are coupled to the REST service layer 130 at the workload management server 150. The socket client 120 is coupled to a socket server 140 at the workload management server 150.

The workload management core 160 includes the following components: a queue manager 162 that manages, for example, active queues and workload queues; a workload repository 164 for storing workload information; a configuration manager 166; a policy engine 168; a resource manager 170; persistence storage 172 for storing a file, a database, etc.; and a priority manager 174.

The configuration manager 166 manages one or more configuration files 167. A configuration file 167 may be described as a file (e.g., an Extensible Markup Language (XML) file) containing class description, resource policies, priority rules, and system parameter settings.

The policy engine 168 manages the one or more resource policies 169. A resource policy 169 may be described as a policy for how physical and logical resources are to be used.

The priority manager 174 manages one or more priority rules 175. A priority rule 175 may be described as providing a technique for assigning a priority to a workload.

The workload management core 160 enables creation and management of ETL workloads via an asynchronous queuing mechanism. The workload management core 160 uses two-level abstraction to represent both logical and physical resources, grants users (e.g., applications executing at the data integration processing engine 100) control over workload priority and scheduling, and determines workload execution order based on three factors (at least one user-specified run schedule, at least one priority rule (i.e., either system provided or user-specified), and at least one resource policy).

In certain embodiments, in order to determine whether a workload is ready to begin execution, the user may either issue the submit workload command followed by a check workload command or issue the begin workload command. In particular, the begin workload command is a synchronized workload management model that submits the workload to the workload management core 160 and waits on the workload to become runnable (i.e., ready to begin execution). The submit workload command is an asynchronous model, in which the user specifies a run schedule using a check workload command to determine whether a workload is ready to begin execution.

Unlike the asynchronous model, the begin workload command does not return until the workload becomes the next runnable workload, and with the begin workload command, there is no need to issue the check workload command. With the asynchronous model, if the user issues the submit command, the user also issues the check workload command to check the resource availability.

Regardless of whether the submit workload command followed by the check workload command or the begin workload command is issued, once the workload is runnable, the user receives an indication that the workload is runnable and may then start the workload execution within the data integration processing engine 100, outside of the workload management server 150.

In certain embodiments, the workload management core 160 priority rules provided include, but are not limited to: an elapsed time rule, a priority weight rule, and a workload run ratio rule. Also, users may specify other priority rules to be used to determine the priority of a workload.

In certain embodiments, the resource policy may be a workload count policy that imposes a limit on the total number of workloads that can run concurrently. The user can specify a value that applies to the entire system and also specify a value that applies to each queue. For example, one resource policy says system-level workload count is 60, and the workload count for each queue is 20. In certain embodiments, the specified workload count for a queue can exceed that of the system, but the system value determines the final workload count.

With embodiments, the workload management core 160 is tightly coupled within an ETL application and is able to create "logical resources" out of the ETL system. This means that the workload management core 160 uses metrics available to an ETL system to co-ordinate workload, for example limiting the number of ETL workloads started in a given time frame, or giving different types of ETL workloads precedence over other types of workloads (i.e., a data quality workload has higher priority than a data integration workload), or giving workloads owned by a particular project a higher priority. That is, a logical resource may be described as representing an ETL metric.

The workload management core 160 manages and optimizes ETL workload execution based on system capacity, system resource usage level, and a configuration file. The workload management core 160 is transparent to normal information integration developers and an administrator may adjust configuration defined in the configuration file on an as needed basis. The configuration of workloads may be adjusted dynamically with the existing workloads present in the workload management core 160. With the workload management core 160, new configuration information may be applied automatically, without workload management server 150 shutdown and restart.

In certain embodiments, the workload management server 150 wraps on top of the workload management core 160 and provides the following functions: a multi-thread socket server 140 so that socket clients 120 from the data integration processing engine 100 can interact with the workload management core 160 via a socket client 120 for workload scheduling and control and a REST service layer 130 so that the socket client 120 can choose to interact with the workload management core 160 for configuring and monitoring workloads via a centralized interface (e.g., a web interface). Thus, the data integration processing engine 100 may issue commands to the workload management server 150 via the components 110, 112, 130 or via components 120, 140.

Embodiments provide the WLMClient API 112 to interact with workload management core 160 so that the user can submit a workload for execution, check a workload for execution, report back a completed workload, query system state, and create or manage the queue state. That is, the WLMClient API 112 handles the incoming user commands for submitting workload, administration and maintenance, reporting and status, etc. The WLMClient API 112 makes calls to the appropriate workload management core 160 components to execute the commands.

Logical Resources

The workload management core 160 supports logical resources in addition to physical resources to better meet data integration requirements. Physical resources, include, but are not limited to, Central Processing Unit (CPU) or processor, memory, disk space, and swap space. In addition to physical resources, the workload management core 160 allows the user to define logical resources and how to share those logical resources among workloads through resource policies. In certain embodiments, a logical resource may be defined as one of many different types including, but not limited to:

- number of concurrent workloads
- number of workloads that can be started within a given time frame
- workload type associated with specific data integration functionality, such as, for example, data quality, data profiling, data transformation, business glossary, metadata management, database connectivity, real-time services, data analysis and reporting, etc.
- workload type categorized by physical resources utilization, such as, for example, low/medium/high CPU/memory/disk consumption
- workload type specific to a user role, such as, for example, normal or admin user
- workload type specific to parallelism, such as, for example, parallel workload, sequential workload, sequence workload
- number of partitions, such as, for example, 2-node, 4-node, 8-node, etc.
- workloads within a specific project
- resource allocation of logical and physical resources (e.g., a percentage, such as 30%, 60%, etc., of a logical or physical resource that a queue may get)

Resource Policy Representation

In certain embodiments, a resource policy has a two-level hierarchical representation that defines what (logical, physical, or both) resources are allocated to that resource policy (relative to the system-level resources) and how those resources are distributed among different queues. With embodiments, different queues may share the same resource policy, but with different resource distribution. FIG. 2 illustrates an example snippet of a workload manager configuration file 200 in accordance with certain embodiments. The workload manager configuration file 200 shows queue (class) definition, WorkloadCount resource, and NormalPolicy.

Asynchronous Callback

The workload management core 160 provides an asynchronous callback mechanism. With the workload management core 160, a workload is started once the workload has been determined as the next runnable workload. However, with the workload management core 160, the user has control over the transition phase between queued and running. In particular, if the user needs to perform additional tasks right before workload run, with embodiments, there is a time window available to do so. For example, if disk space is full and a workload may fail due to lack of disk space, the user is able to clean up disk before the workload starts. Another example is that a workload may not be runnable, so the user may reset the workload (i.e., clean up failure state). The workload management core 160 provides flexibility for the user to start the workload when the workload is ready. The asynchronous calls (e.g., submit workload, check workload, end workload) may be made by the user to indicate that a transition phase (e.g., queued→running, running→completed) is ready to occur from an application perspective.

The workload management core 160 provides an interface for the user to integrate a workload scheduler with workload management. One example of a workload scheduler is a workload sequencer, which may consist of several workloads that are to be executed in a predefined sequence. With embodiments, the workload sequencer is not treated as a workload, instead, the workloads inside the workload sequencer are treated as separate workloads. The workloads that are ready to run, according to the order predefined by the workload sequencer, are run. No extra resources need to be reserved, making it possible for other workloads to run. The reason this approach can work is because the sequence order may be maintained outside the workload management core 160 because of the asynchronous callback mechanism.

Priority Rules

Examples of priority rules include, but are not limited to: an elapsed time rule, a priority weight rule, and a workload run ratio rule.

The elapsed time rule treats all workloads as having the same priority and ensures first-in first-out fairness.

The priority weight group assigns a coefficient to a specific attribute and uses the coefficient to calculate a priority index. In certain embodiments, the following attributes may be used to determine a priority weight (with example priority weights shown in parenthesis):

- High priority workload (50), medium priority workload (20), low priority workload (10)
- Parallel workload (30), sequential workload (5), sequence workload (20)
- CPU intensive workload (40), Input/Output (I/O) intensive workload (30), database workload (20)
- Workload running on 4 partitions (20), workload running on 2 partitions (10), workload running on 1 partition (5)
- Development project (10), testing (50), production (100)

In certain embodiments, the priority index may be calculated using the formula given below:

$$\text{Priority Index} = \text{PriorityWeight} * 20 + \text{WorkloadQueuedTime}$$

For example, assume that the user wants to assign high, medium, or low priority to three queues, respectively. The user then selects the priority weight rule, and this rule ensures workloads in the high priority queue get higher priority to run next. The workload management core 160 determines the priority index of a queued workload based on the priority of that workload and the amount of time the workload waits in queue. Then, the workload management core 160 picks up the workload with the highest priority index to run next.

Figure 3:
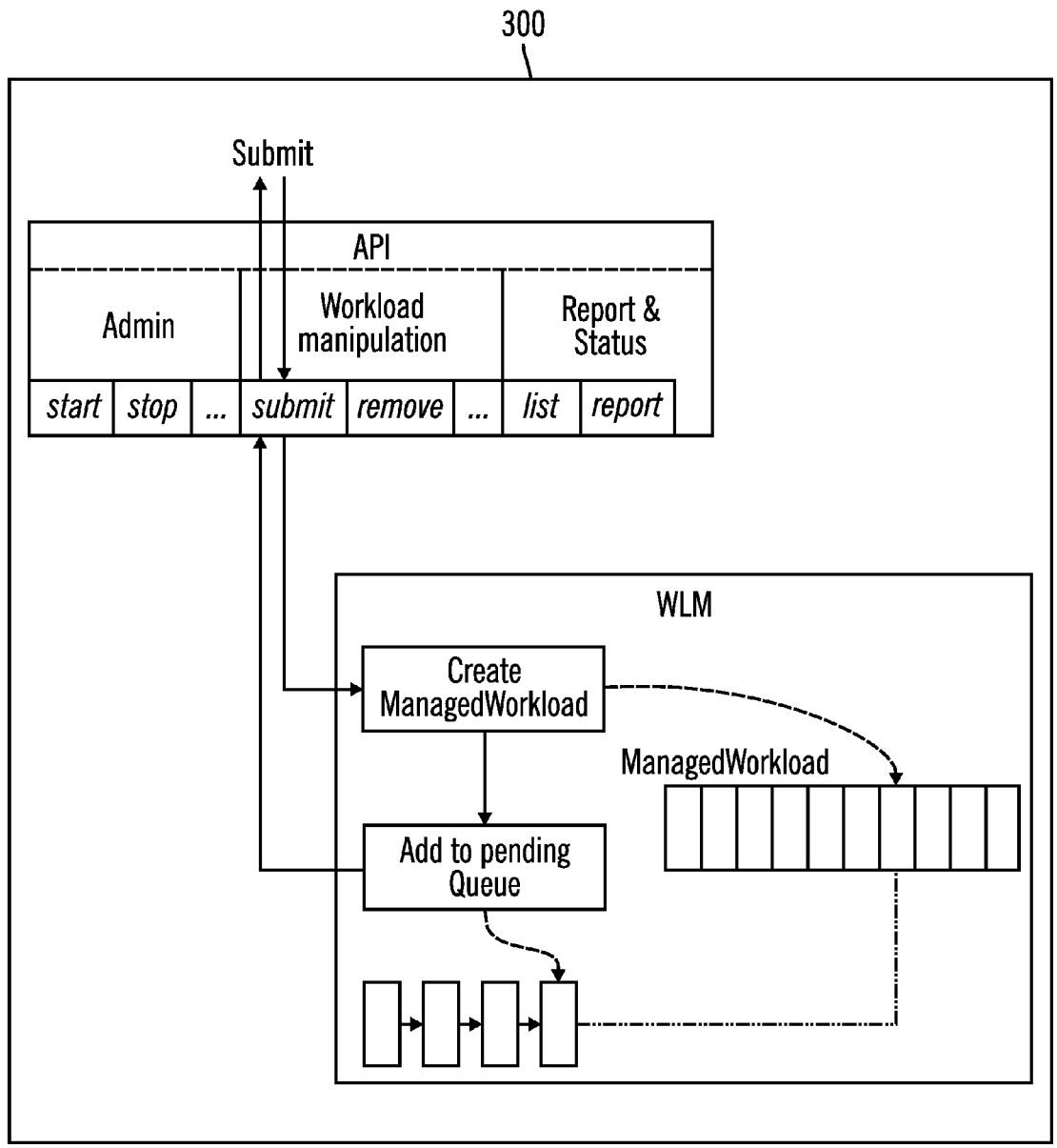
FIG. 3 illustrates operations and structures for processing a submit workload command in accordance with certain embodiments.

The workload run ratio rule defines the order and the number of workloads that may be run across all queues. The following are examples:

- five workloads from high priority queues, 2 workloads from medium priority queues, and one workload from low priority queues
- one information analyzer workload, two quality stage workloads, three data stage workloads, ten web service workloads one workload from each project
one workload running on 4 partitions, two workloads running on 2 partitions, four workloads running on 1 partition
three development workloads, five testing workloads, twenty production workloads Architecture: WLMClient API Thread FIG. 3 illustrates operations and structures 300 for processing a submit workload command in accordance with certain embodiments. The workload name (rather than the workload itself) is brought into the workload management core 160, assigned a workload Id, classified by the queue manager 162, and stored in the workload repository 164. The user may later use the workload identifier (ID) returned from the submit workload command with a check workload command to see whether the workload is ready to run. If the check workload command returns true, the user may then start the workload. The check workload command invokes the priority manger 174 and the policy engine 168. Other commands invoke other components. For example, a save configuration command utilizes the configuration manager 166.

Queue Management Model

Figure 4:
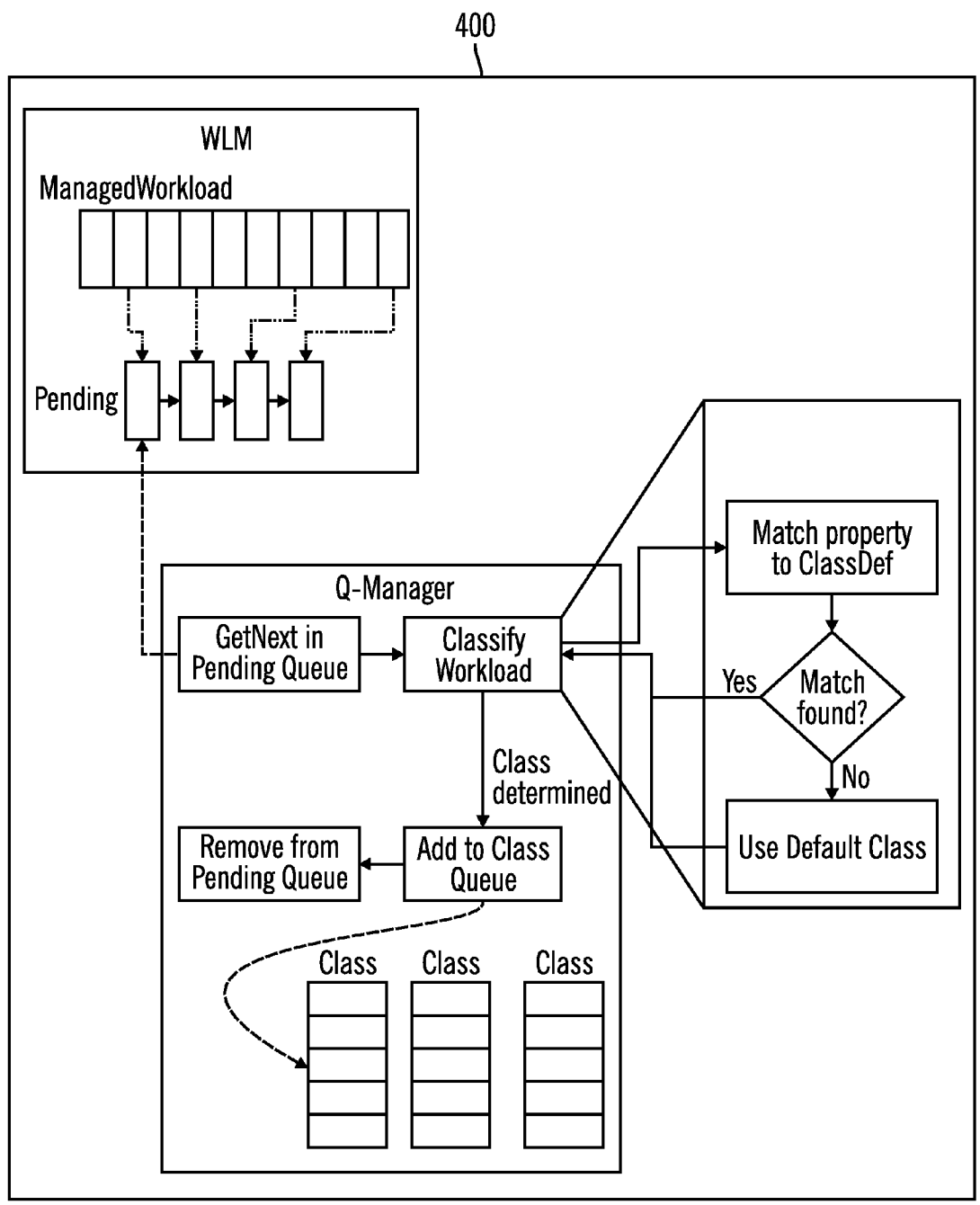
FIG. 4 illustrates operations and structures for a queue manager thread in accordance with certain embodiments.

FIG. 4 illustrates operations and structures 400 for a queue manager thread in accordance with certain embodiments. Conceptually, the workload management server 150 maintains a list of queues based on a configuration file, and a workload submitted to the workload management core 160 is classified into a particular one of the queues depending on workload attributes at workload submit time.

System Resource Management

The workload management server 150 parses the configuration file, which models the system capacity, the workload execution policy, etc., and looks up system utilization in real time to determine how to optimize the workload execution from different queues. For instance, if the system constraint is if the system CPU usage is above 90%, do not schedule any workload to execute, then, when the user is checking whether the user may proceed with workload execution, the resource manager 170 looks at the system utilization and configuration information to determine whether the system has capacity to execute this workload or not. If the resources needed by the workload are not available, the user will have to check back again.

Resource Allocation Model

Figure 5:
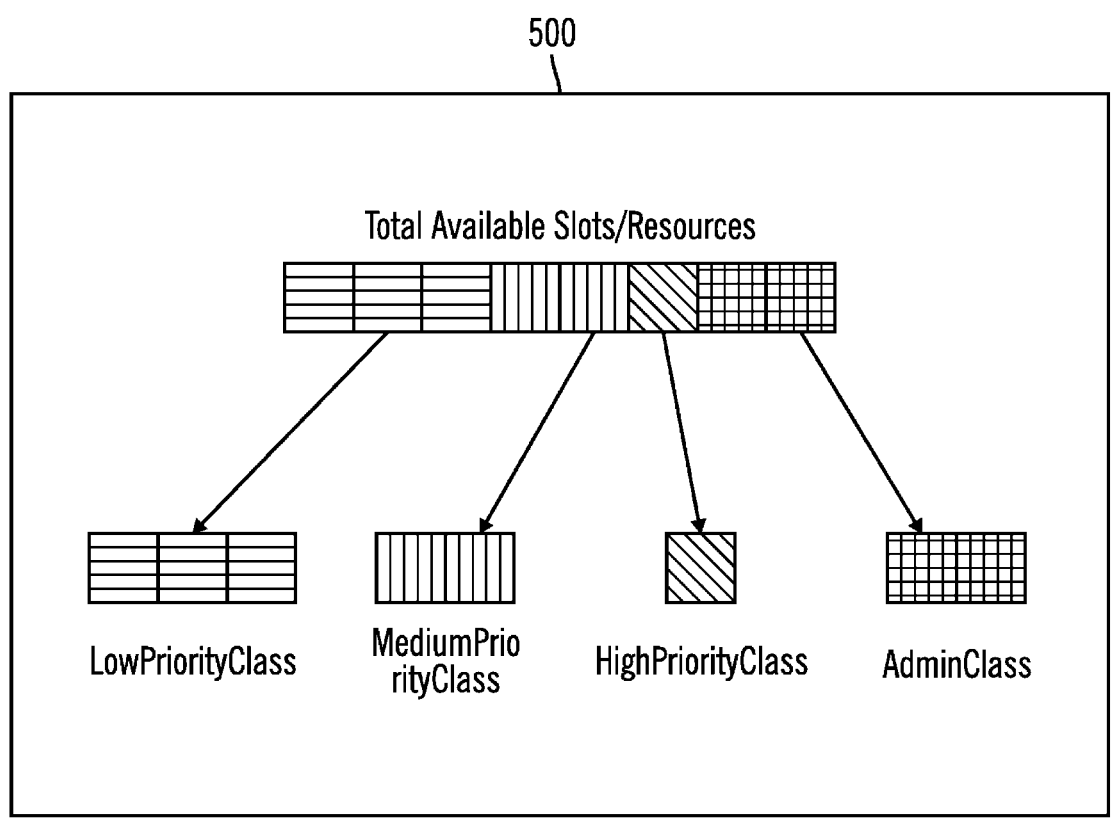
FIG. 5 illustrates different queues and how resources may be allocated to the different queues in accordance with certain embodiments.

FIG. 5 illustrates different queues 500 and how resources may be allocated to the different queues in accordance with certain embodiments. In the example of FIG. 5, there are 8 available slots, with 3 slots allocated to a low priority queue, 2 slots allocated to a medium priority queue, 1 slot allocated to a high priority queue, and 2 slots allocated to an admin queue.

Priority and Policy Model

Figure 6:
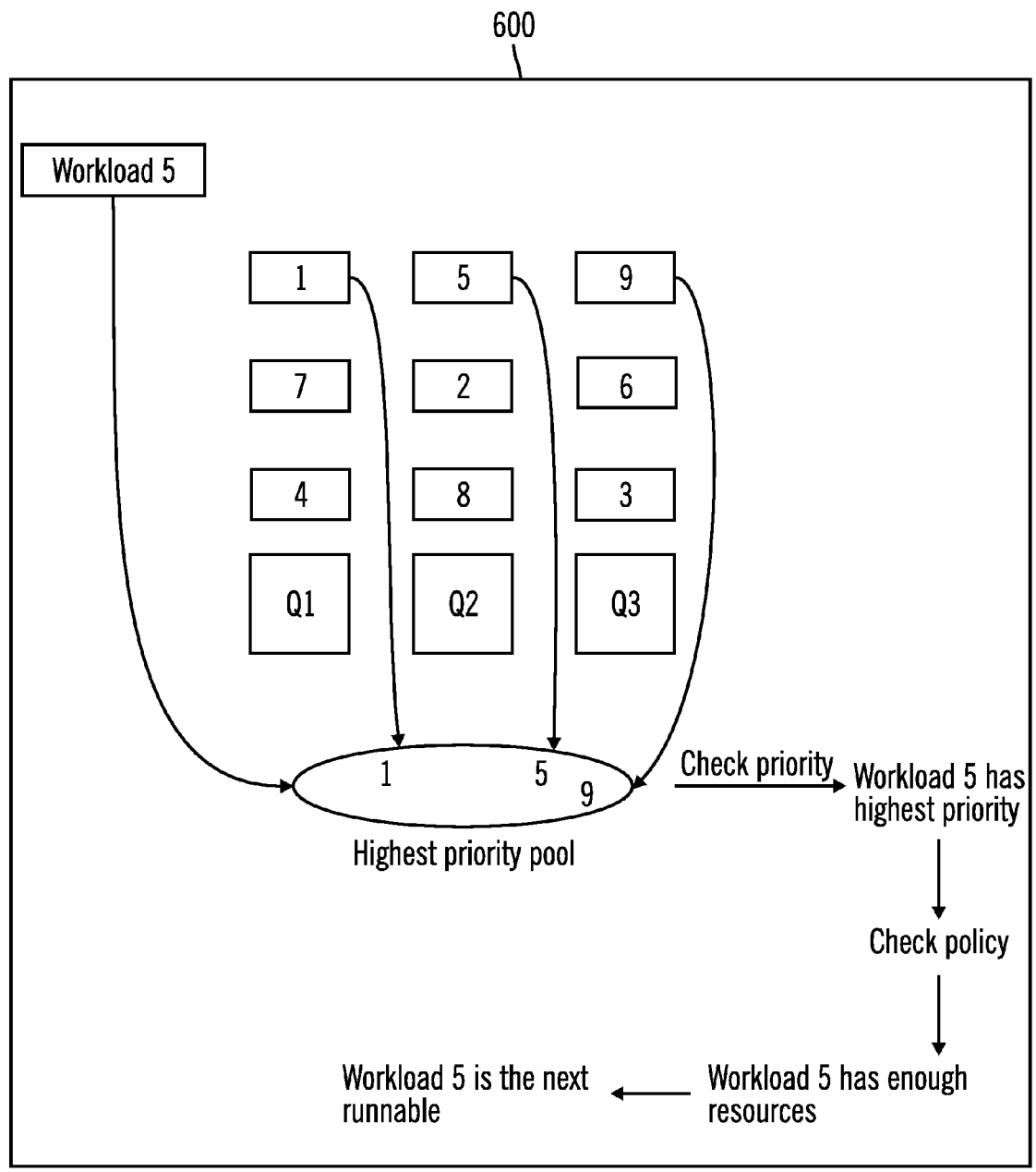
FIG. 6 illustrates how a workload management core determines whether or not a given workload is a next runnable workload in accordance with certain embodiments.

FIG. 6 illustrates how the workload management core 160 determines whether or not a given workload is the next runnable workload in accordance with certain embodiments. The workload management core 160 uses both a priority rule and the resource policy to make the decision. The user calls the check workload command with workload ID 5. The priority manager 174 populates the priority pool with the first workload from each queue. The priority manager 174 determines the priority index of each workload in the pool based on the selected priority rule. The priority manager 174 compares the priority of the given workload against the priority pool. If the workload has the highest priority, the policy engine 168 then checks the resource policy that workload 5 needs to follow to see whether there are enough resources. If so, workload 5 becomes the next runnable workload.

Dynamic Configuration Update Model

Figure 7:
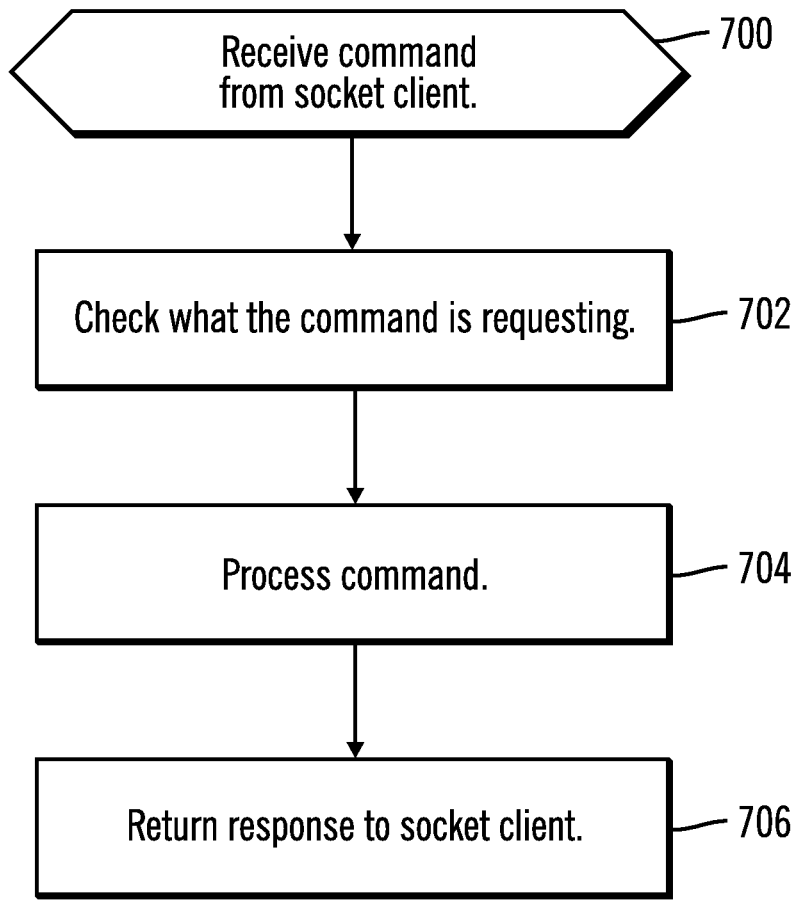
FIG. 7 illustrates, in a flow diagram, operations for overall flow in accordance with certain embodiments.

When the user issues the save configuration command to update the workload management configuration file in terms of classes, resources, policies, and parameters, the workload management core 160 performs the following tasks:
Persists the current state of the system including queues, workloads, resources, policies, and system parameters
Parses the save configuration command to retrieve the information that needs to be updated
Overrides the current configuration file on disk with new updated information
Loads updated configuration file from disk to memory
Restores the state of queues and workloads Flow of Processing FIG. 7 illustrates, in a flow diagram, operations for overall flow in accordance with certain embodiments. Control begins at block 700 with the workload management core 160 receiving a command from a socket client 120. In block 702, the workload management core 160 checks what the command is requesting. In block 704, the workload management core 160 processes the command. In block 706, the workload management core 160 returns a response to the socket client 120.

Figure 8:
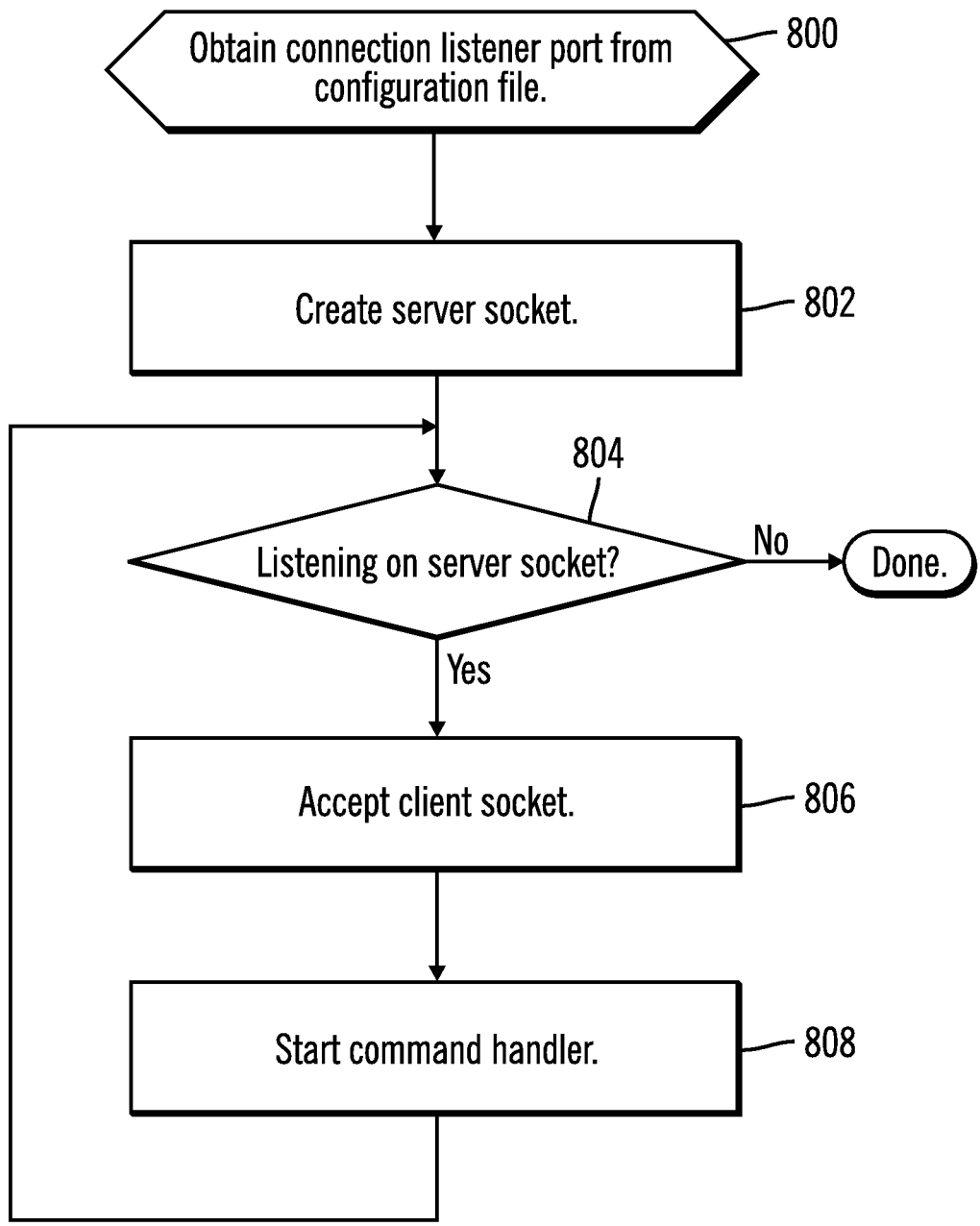
FIG. 8 illustrates, in a flow diagram, operations for connection manager flow in accordance with certain embodiments.

FIG. 8 illustrates, in a flow diagram, operations for connection manager flow in accordance with certain embodiments. In certain embodiments, the connection manager is part of the socket server 140. Control begins at block 800 with the connection manager obtaining a connection listener port from a configuration file. In block 802, the connection manager creates a server socket. In block 804, the connection manager determines whether there is listening on the server socket. If so, processing continues to block 806, otherwise, processing is done. In block 806, the connection manager accepts the client socket 120, which is a port from which the socket client 120 sends requests. In block 808, the connection manager starts the command handler (e.g., a command handler thread).

Various handlers are described herein. In certain embodiments, such handles are part of the server socket 140.

Figure 9A:
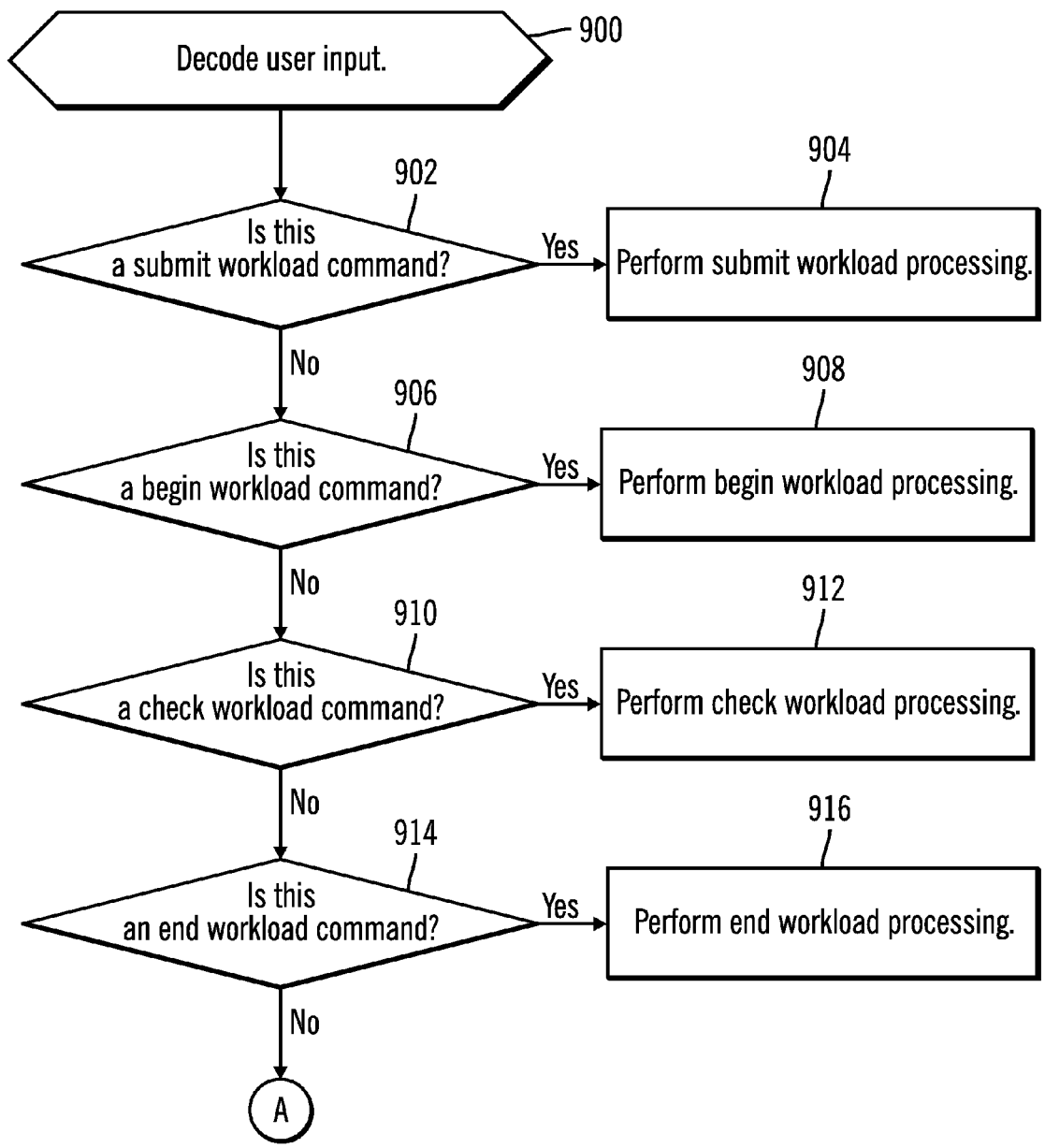
FIG. 9 illustrates, in a flow diagram, operations for command handler flow in accordance with certain embodiments.
Figure 9B:
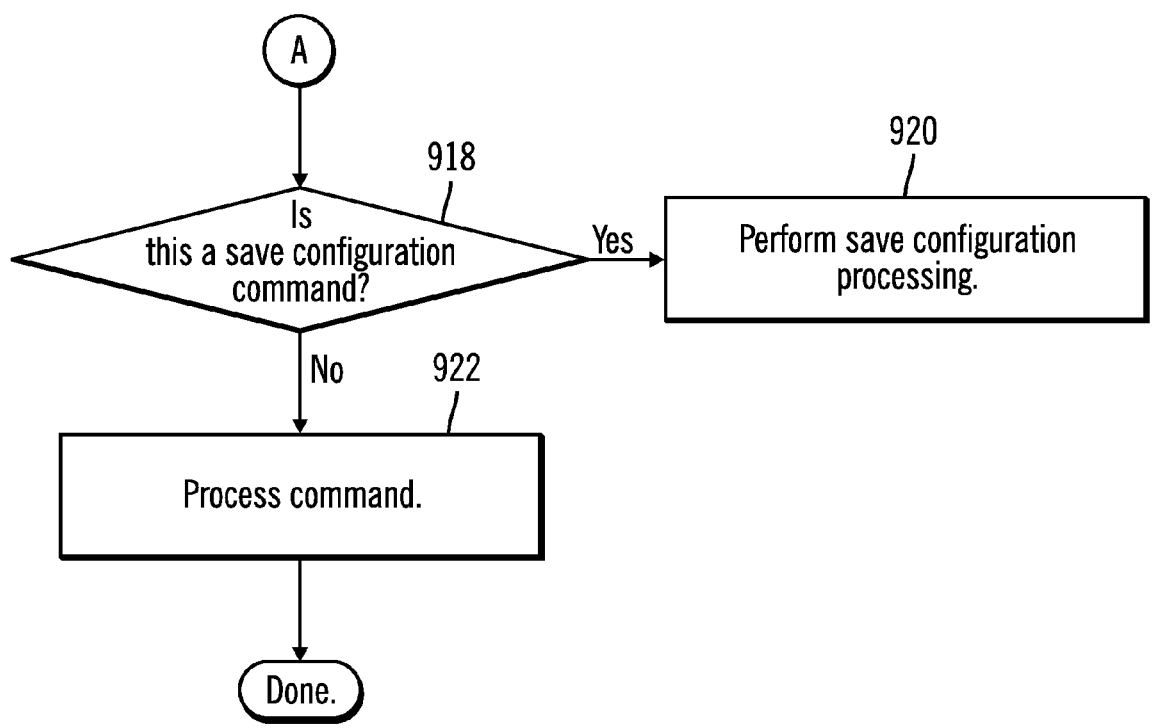

FIG. 9 illustrates, in a flow diagram, operations for command handler flow in accordance with certain embodiments. FIG. 9 is formed by FIG. 9A and FIG. 9B. Control begins at block 900 with the command handler decoding the user input. In block 902, the command handler determines whether this is a submit workload command. If so, processing continues to block 904, otherwise, processing continues to block 906. In block 904, the command handler initiates submit workload processing (e.g., by creating a submit workload handler).

In block 906, the command handler determines whether this is a begin workload command. If so, processing continues to block 908, otherwise, processing continues to block 910. In block 908, the command handler initiates begin workload processing (e.g., by creating a begin workload handler).

In block 910, the command handler determines whether this is a check workload command. If so, processing continues to block 912, otherwise, processing continues to block 914. In block 912, the command handler initiates check workload processing (e.g., by creating a check workload handler).

In block 914, the command handler determines whether this is an end workload command. If so, processing continues to block 916, otherwise, processing continues to block 918 (FIG. 9B). In block 916, the command handler initiates end workload processing (e.g., by creating an end workload handler).

In block 918, the command handler determines whether this is a save configuration command. If so, processing continues to block 920, otherwise, processing continues to block

922. In block 920, the command handler initiates save configuration workload processing (e.g., by creating a save configuration handler).

In block 922, the command handler processes the command. In certain embodiments, in block 922, the command may be determined to be: check class, check status of workload, get average queued time, get configuration, list all workloads, list active workloads, list pending workloads, list class, move workload between queues or within a queue, and remove workload from queue.

Figure 10A:
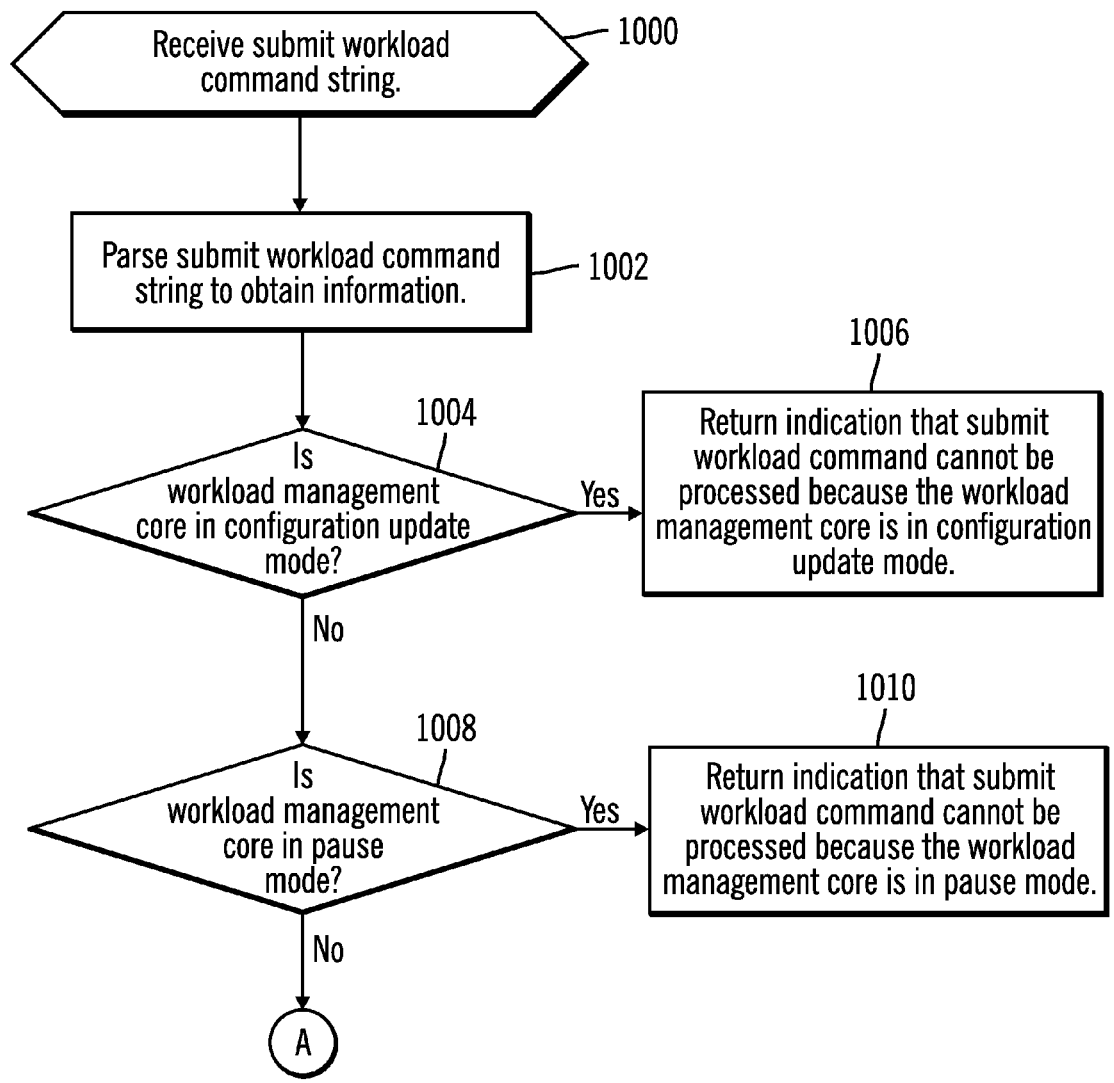
FIG. 10 illustrates, in a flow diagram, operations for processing the submit workload command in accordance with certain embodiments.
Figure 10B:
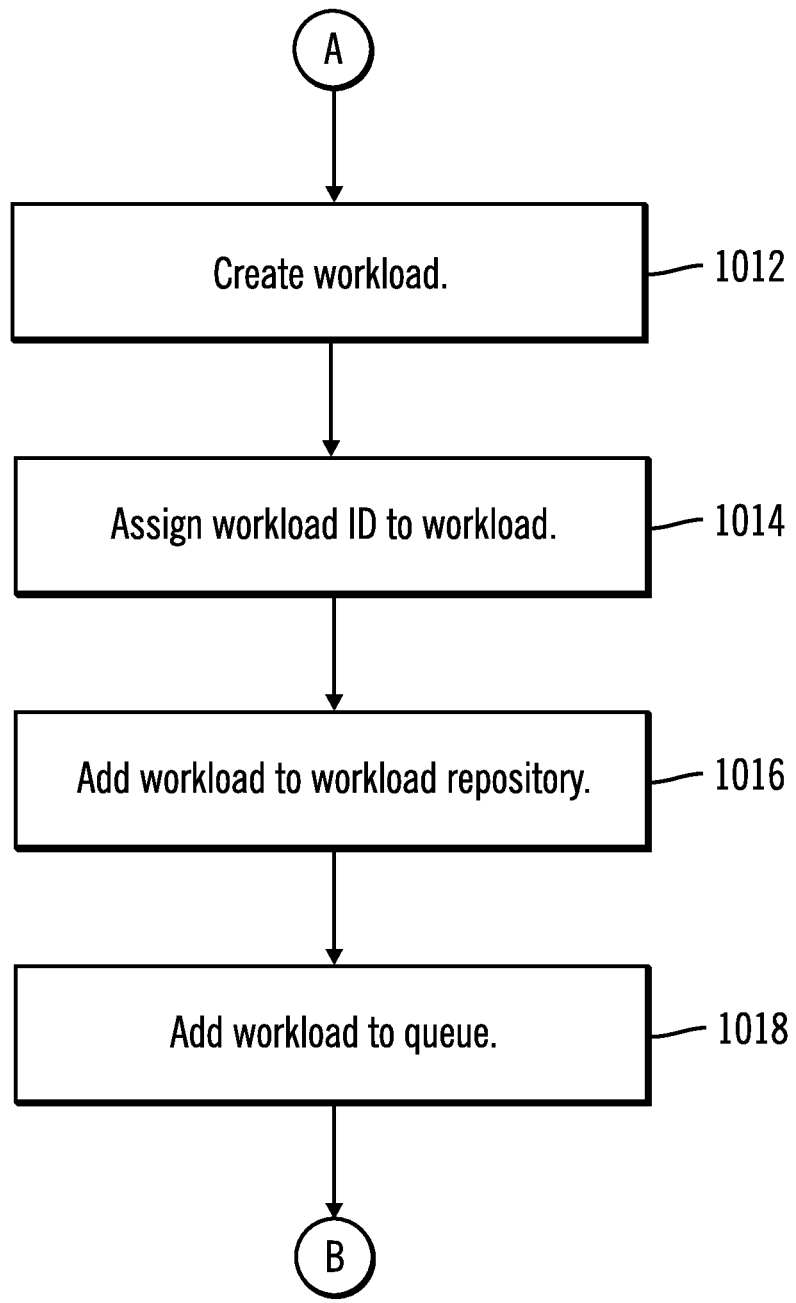
Figure 10C:
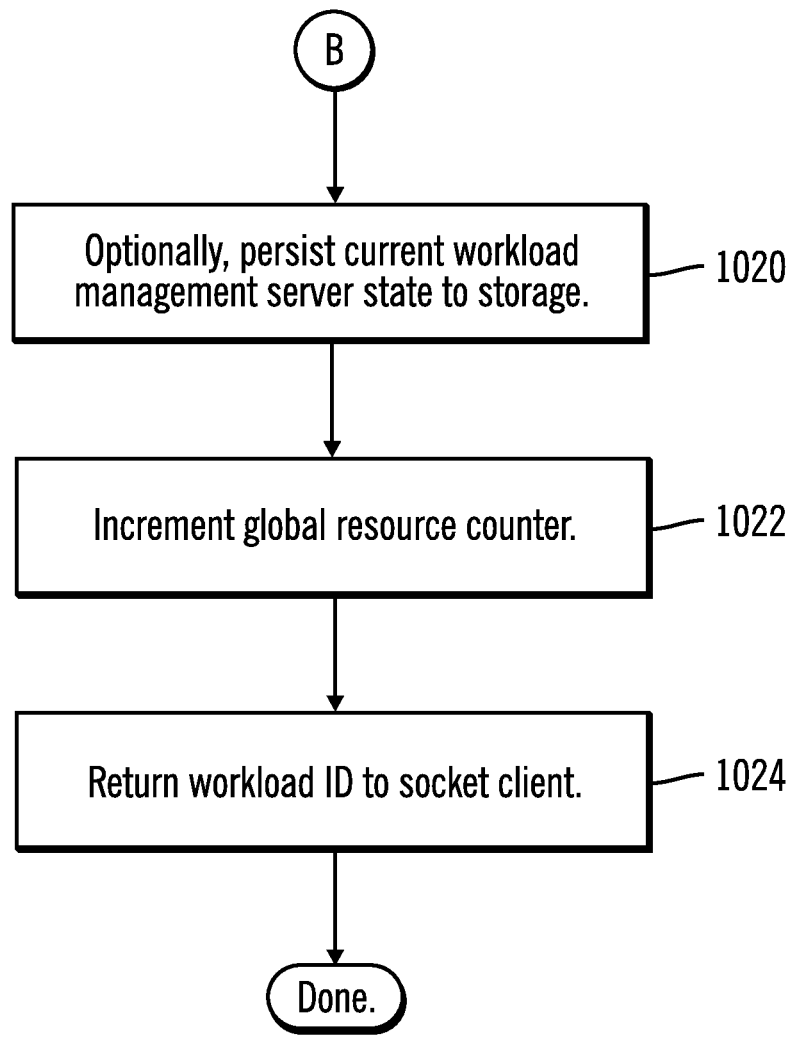

FIG. 10 illustrates, in a flow diagram, operations for processing the submit workload command in accordance with certain embodiments. FIG. 10 is formed by FIGS. 10A, 10B, and 10C. Control begins with a submit workload handler receiving the submit workload command string. In block 1002, the submit workload handler parses the submit workload command string to obtain information. In certain embodiments, the information includes: a queue name (of the queue into which the workload is to be placed), a workload identifier (e.g., a workload name), a location of workload (e.g., a folder name), a parent workload (e.g., a project name) of the current workload (for which the command was received), a workload type (e.g., batch or real time), a workload description, a process ID of the process that sent the workload command, a workload class name, and/or command options. In various embodiments, different items may be obtained from the parsing, including additional items not listed.

In block 1004, the submit workload handler determines whether the workload management core 160 is in configuration update mode. If so, processing continues to block 1006, otherwise, processing continues to block 1008. In block 1006, the submit workload handler returns an indication that the submit workload command cannot be processed because the workload management core 160 is in configuration update mode.

In block 1008, the submit workload handler determines whether the workload management core 160 is in pause mode. In certain embodiments, no workload may be submitted when the pause mode is on. If so, processing continues to block 1010, otherwise, processing continues to block 1012 (FIG. 10B). In block 1010, the submit workload handler returns an indication that the submit workload command cannot be processed because the workload management core 160 is in pause mode.

In block 1012, the submit workload handler creates a workload. In certain embodiments, creating a workload creates a workload object. In certain embodiments, a workload class is obtained from the workload class name and then the workload is created based on the workload class, the command options, project name, workload name, process ID, workload type, and workload description.

In block 1014, the submit workload handler assigns a workload ID to the workload. In block 1016, the submit workload handler adds the workload to the workload repository 164. In block 1018, the submit workload handler adds the workload to the queue identified by parsing the submit workload command string. For example, the queue may be a low priority queue, a medium priority queue or a high priority queue. From block 1018 (FIG. 10B), processing continues to block 1020 (FIG. 10C).

In block 1020, the submit workload handler, optionally, persists the current workload management server 150 state to storage (e.g., to file or database per the user's selection). In block 1022, the submit workload handler increments a global resource counter (e.g., a workload counter). In block 1024, the submit workload handler returns the workload ID to the socket client 120.

Figure 11A:
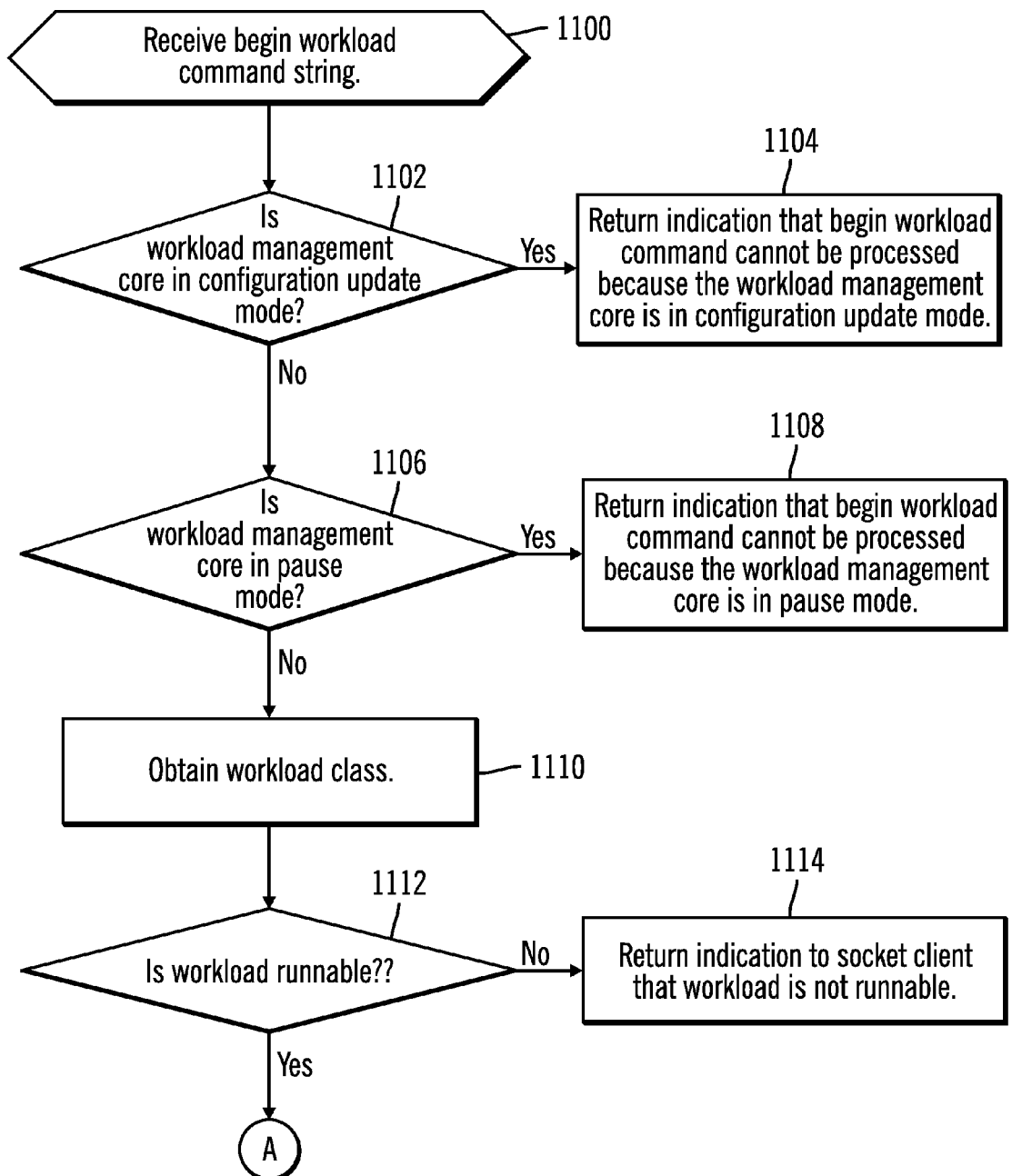
FIG. 11 illustrates, in a flow diagram, operations for processing the begin workload command in accordance with certain embodiments.
Figure 11B:
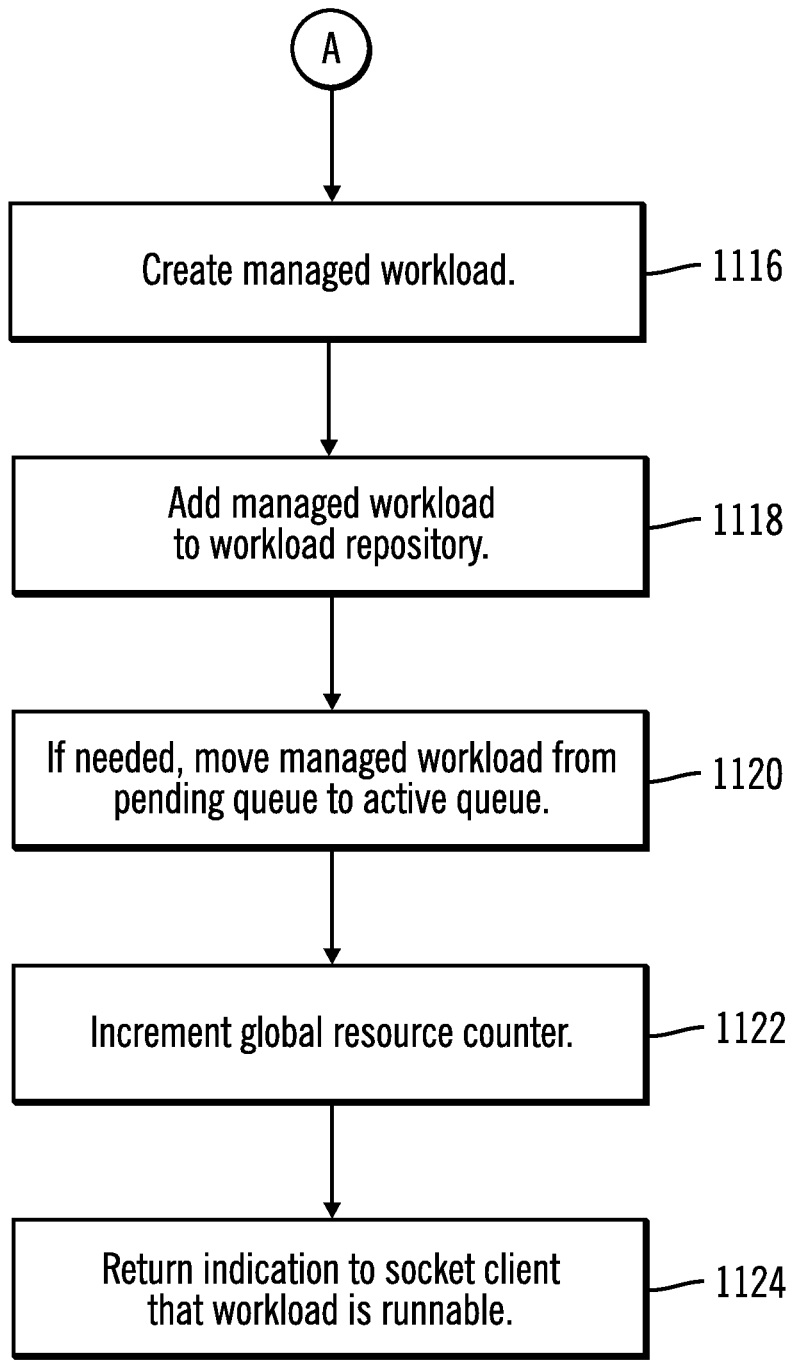

FIG. 11 illustrates, in a flow diagram, operations for processing the begin workload command in accordance with certain embodiments. FIG. 11 is formed by FIGS. 11A and 11B. Control begins with a begin workload handler receiving the begin workload command string.

In block 1102, the begin workload handler determines whether the workload management core 160 is in configuration update mode. If so, processing continues to block 1104, otherwise, processing continues to block 1106. In block 1104, the begin workload handler returns an indication that the begin workload command cannot be processed because the workload management core 160 is in configuration update mode.

In block 1106, the begin workload handler determines whether the workload management core 160 is in pause mode. If so, processing continues to block 1108, otherwise, processing continues to block 1110. In block 1108, the begin workload handler returns an indication that the begin workload command cannot be processed because the workload management core 160 is in mode.

In block 1110, the begin workload handler obtains a workload class. In block 1112, the begin workload handler determines whether the workload is runnable (using the operations of FIG. 13). If so, processing continues to block 1116 (FIG. 11B), otherwise, processing is continues to block 1114. In block 1114, the begin workload handler returns an indication to the socket client 120 that the workload is not runnable.

In block 1116, the begin workload handler creates a managed workload using the workload class. In certain embodiments, a managed workload may be described as an object that encapsulates information related to a workload as described in blocks 1012 and 1014 for the submit workload command. In block 1118, the begin workload handler adds the managed workload to the workload repository 164. In block 1120, if needed, the begin workload handler moves the managed workload from a pending queue to an active queue. In certain embodiments, the managed workload is removed from the pending queue and added to the active queue. That is, the managed workload may already be in an active queue (e.g., if a check workload command was issued that already moved the managed workload). In block 1122, the check workload handler increments a global resource counter. In block 1124, the check workload handler returns an indication that the workload is runnable. The begin workload handler may also perform other processing, such as bookkeeping.

In certain embodiments, the pending queue and the active queue are two internal queues maintained by the workload management server 150. Other queues may be user-defined. The pending queue may be described as a temporary space where a workload stays before the workload is classified by the workload management server 150. Once classification is done, the workload is removed from the pending queue to an associated class queue, waiting for the workload to run. When the workload becomes the next runnable workload, the workload is moved from the class queue to the active queue. The workloads in the active queue are currently running.

Figure 12:
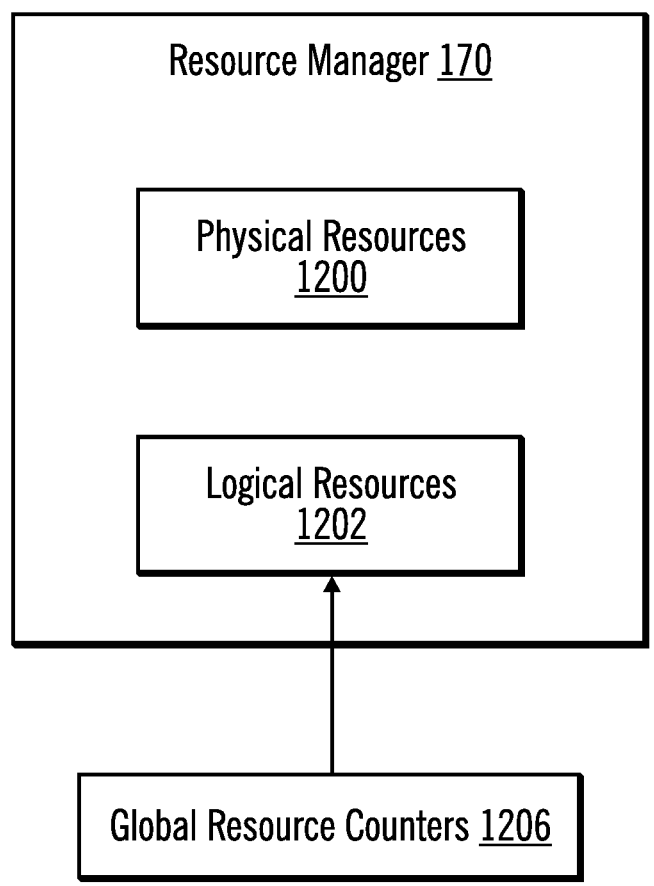
FIG. 12 illustrates further details of a resource manager in accordance with certain embodiments.

FIG. 12 illustrates further details of the resource manager 170 in accordance with certain embodiments. The resource manager 170 manages physical resources 1200 and logical resources 1202. The resource manager 170 checks the physical resources (e.g., to determine CPU usage and memory usage). The global resource counters 1206 are stored for counting logical resources. In certain embodiments, one global resource counter is used to keep count of the number of workloads in all of the queues.

Figure 13A:
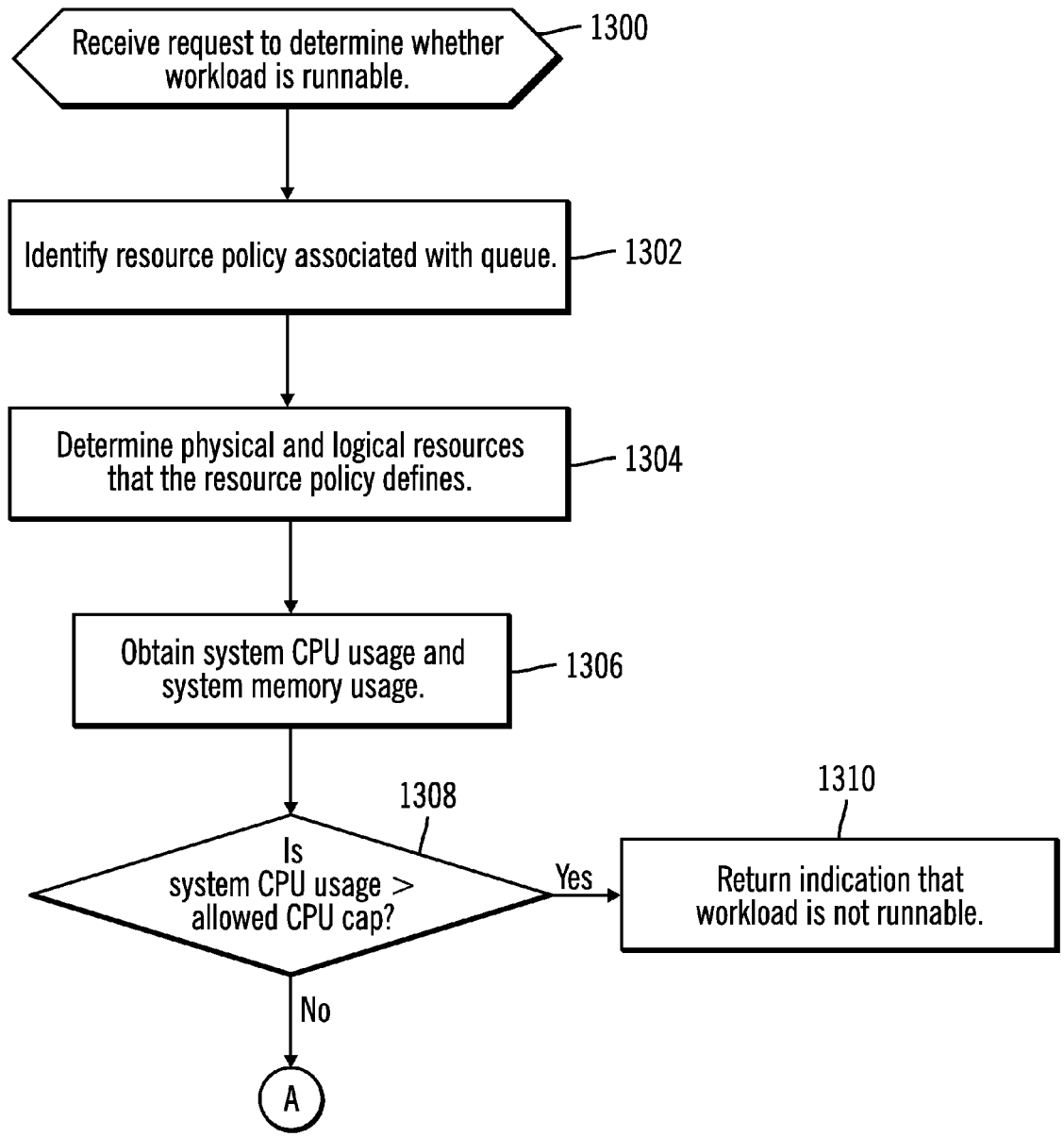
FIG. 13 illustrates, in a flow diagram, operations for determining whether a workload is runnable in accordance with certain embodiments.
Figure 13B:
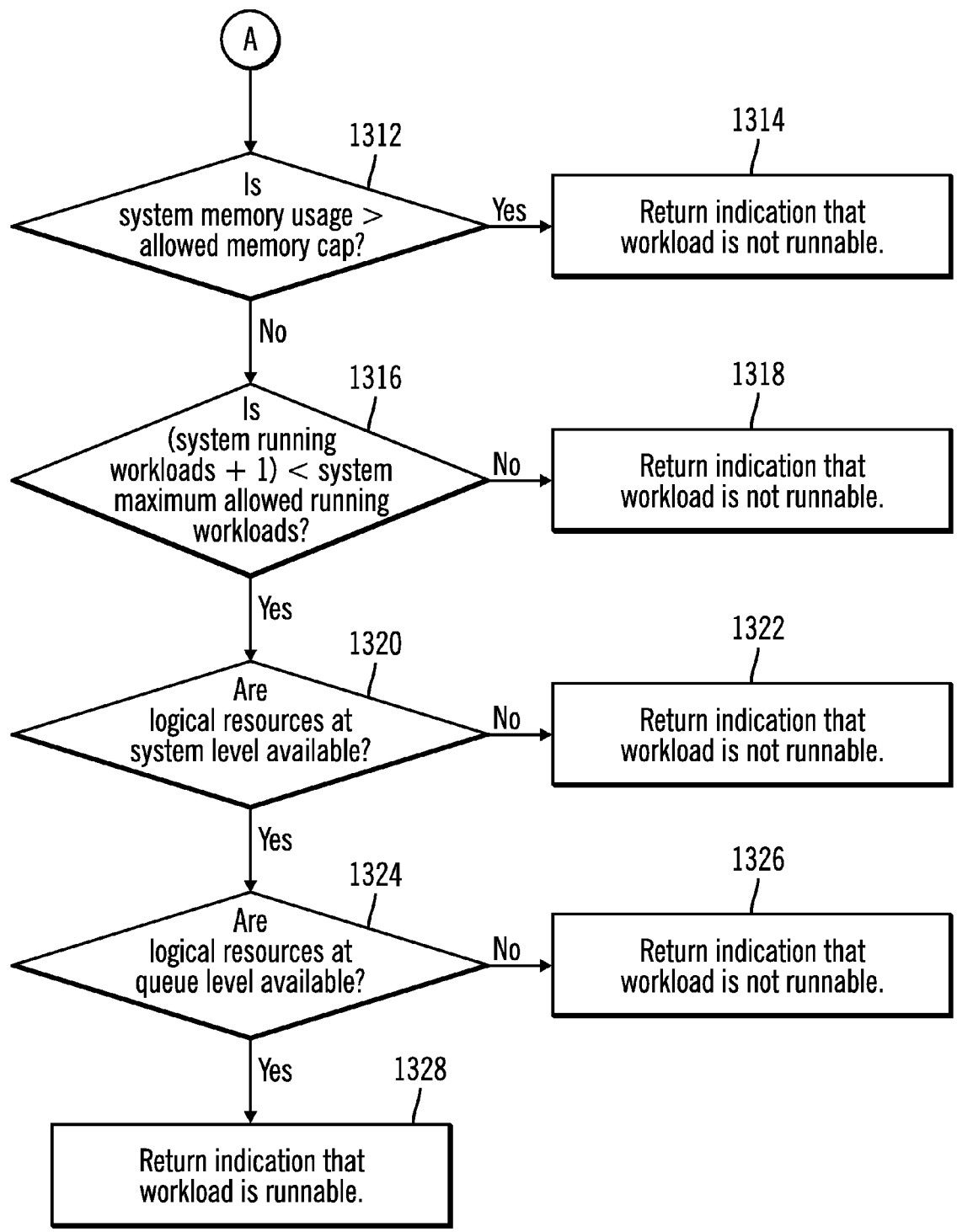

FIG. 13 illustrates, in a flow diagram, operations for determining whether a workload is runnable in accordance with certain embodiments. FIG. 13 is formed by FIGS. 13A and 13B. Control begins at block 1300 with the policy engine 168 receiving a request to determine whether a workload is runnable. In block 1302, the policy engine 168 identifies a resource policy associated with the queue. In certain embodiments, a resource policy is associated with each queue, and this resource policy is identified. In block 1304, the policy engine 168 determines the physical and logical resources that the resource policy defines.

In block 1306, the policy engine 168 obtains system CPU usage and system memory usage. In block 1308, policy engine 168 determines whether the system CPU usage is greater than (">") the allowed CPU cap. If so, processing continues to block 1310, otherwise, processing continues to block 1312 (FIG. 13B). In block 1310, the policy engine 168 returns an indication that the workload is not runnable.

In block 1312, the policy engine 168 determines whether the system memory usage is greater than (">") the allowed memory cap. If so, processing continues to block 1314, otherwise, processing continues to block 1316. In block 1314, the policy engine 168 returns an indication that the workload is not runnable.

In block 1316, the policy engine 168 determines whether the (system running workloads+1) is less than ("<") the system maximum allowed running workloads. If so, processing continues to block 1320, otherwise, processing continues to block 1318. In block 1318, the policy engine 168 returns an indication that the workload is not runnable.

In block 1320, the policy engine 168 determines whether the logical resources at the system level are available. If so, processing continues to block 1324, otherwise, processing continues to block 1322. In block 1322, the policy engine 168 returns an indication that the workload is not runnable.

In block 1324, the policy engine 168 determines whether the logical resources at the queue level are available. If so, processing continues to block 1328, otherwise, processing continues to block 1326. In block 1326, the policy engine 168 returns an indication that the workload is not runnable.

In block 1328, the policy engine 168 returns an indication that the workload is runnable.

Figure 14A:
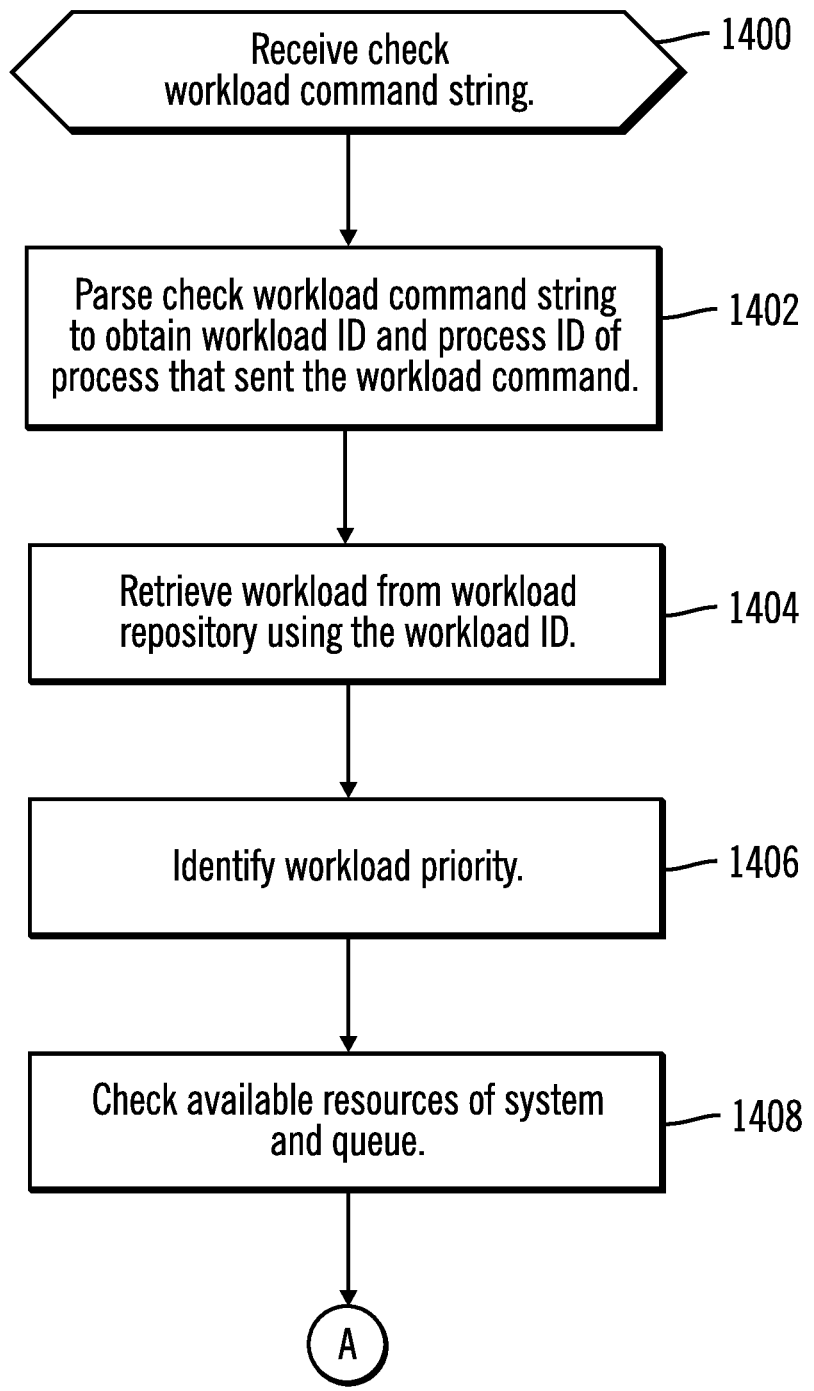
FIG. 14 illustrates, in a flow diagram, operations for processing the check workload command in accordance with certain embodiments.
Figure 14B:
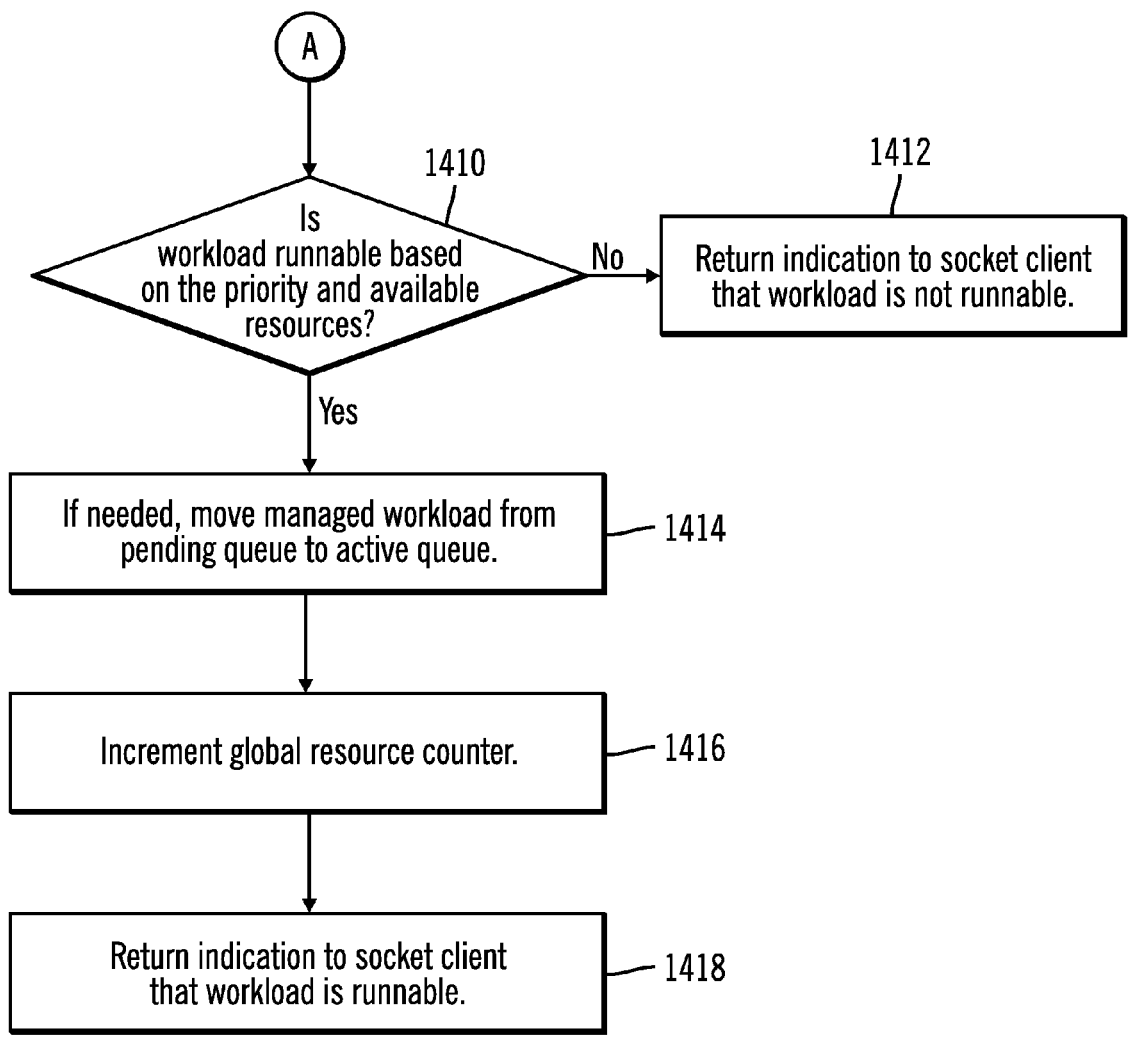

FIG. 14 illustrates, in a flow diagram, operations for processing the check workload command in accordance with certain embodiments. FIG. 14 is formed by FIGS. 14A and 14B. Control begins at block 1400 with the check workload handler receiving a check workload command string. In block 1402, the check workload handler parses the check workload command string to obtain the workload ID and the process ID of process that sent the workload command. In block 1404, the check workload handler retrieves a workload from the workload repository using the workload ID.

In block 1406, the check workload handler identifies the workload priority (using the operations of FIG. 15). In block 1408, the check workload handler checks available resources of the system and the queue (using the operations of FIG. 13).

From block 1408 (FIG. 14A), processing continues to block 1410 (FIG. 14B). In block 1410, the check workload handler determines whether the workload is runnable based on the workload priority and available resources. In certain embodiments, the workload is runnable if the workload priority of the workload is the highest priority of the submitted workloads (i.e., the has_highest_priority indicator for the workload is set to true) and the resources are available for the workload to be executed. If so, processing continues to block 1414, otherwise, processing continues to block 1412. In block 1412, the check workload handler returns an indication to the socket client 120 that the workload is not runnable.

In block 1414, if needed, the check workload handler moves the managed workload from a pending queue to an active queue. That is, the managed workload may already be in an active queue (e.g., if a begin workload command was issued followed by a check workload command (possibly by) different users). In block 1416, the check workload handler increments a global resource counter. In block 1418, the check workload handler returns an indication that the workload is runnable.

FIG. 15 illustrates, in a flow diagram, operations for checking the workload priority in accordance with certain embodiments. FIG. 15 is formed by FIG. 15A, FIG. 15B, FIG. 15C, FIG. 15D, and FIG. 15E. Control begins at block 1500 with the priority manager 174 receiving a request to determine the priority of a workload. The determination is based on one or more priority rules.

In block 1510, the priority manager 174 determines whether an elapsed time priority rule is to be used to determine priority. If so processing continues to block 1512 (FIG. 15B), otherwise, processing continues to block 1524.

In block 1512, the priority manager 174 sets a priority index of each of the workloads that have been submitted equal to ("=") an elapsed time for that workload (where the elapsed time is the time period since the workload was submitted). In block 1514, the priority manager 174 stores the priority index of each of the workloads into a tree map. In block 1516, the priority manager 174 sorts the workloads on the tree map by priority index. In block 1518, the priority manager 174 selects a workload ID associated with the workload that has the highest priority index. In block 1520, the priority manager 174 determines whether the workload to be checked is the workload having the highest priority. If so, processing continues to block 1522, otherwise, processing continues to block 1523. In certain embodiments, the priority manager 174 makes this determination by matching the workload ID of the workload to be checked against the workload ID of the workload having the highest priority. In block 1522, the priority manager 174 sets the has_highest_priority indicator for the workload to true. In Block 1523, the priority manager 174 sets the has_highest_priority indicator for the workload to false.

Returning to FIG. 15A, in block 1524, the priority manager 174 determines whether a priority weight rule is to be used to determine priority. If so processing continues to block 1526 (FIG. 15C), otherwise, processing continues to block 1530.

Figure 15A:
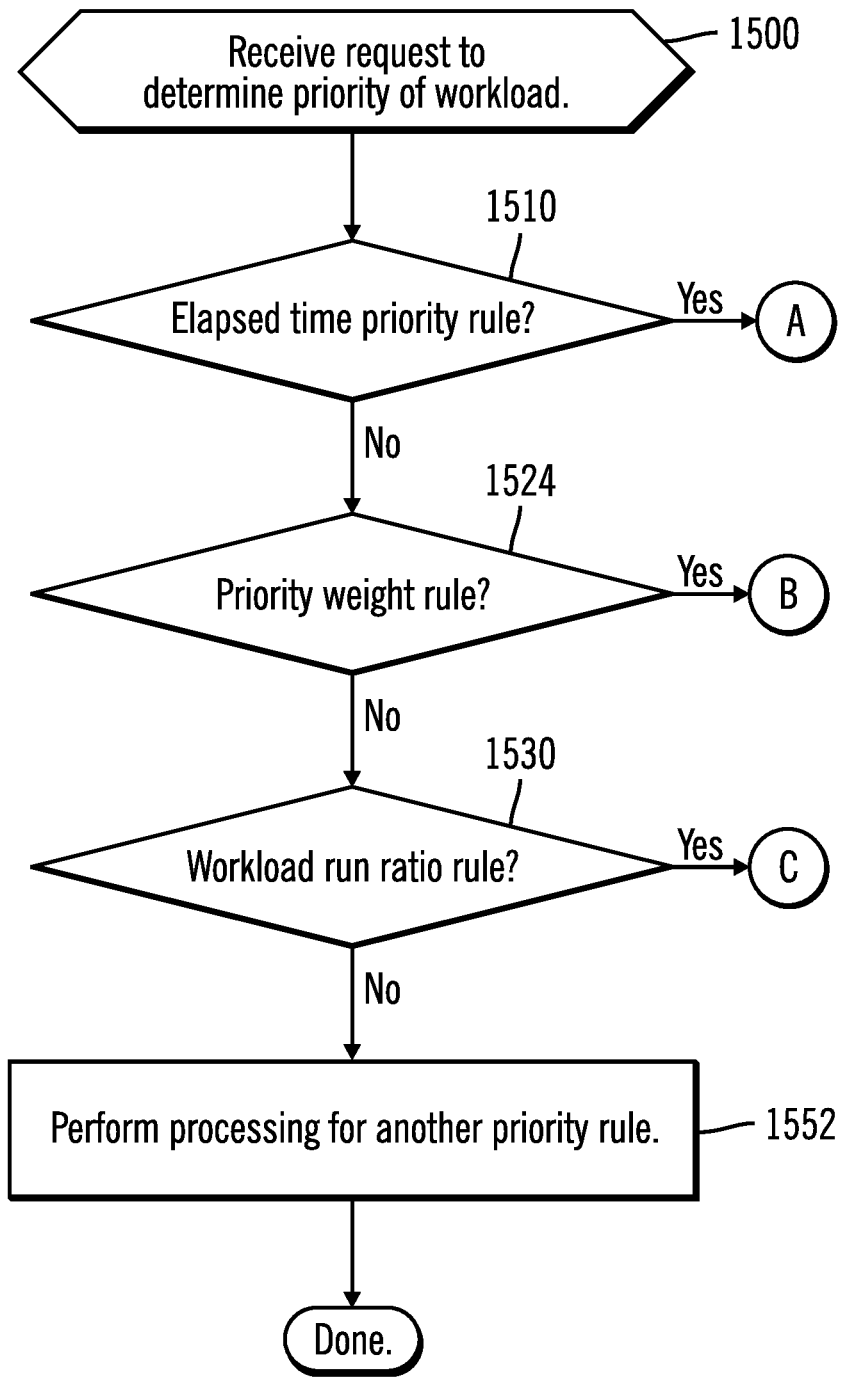
FIG. 15 illustrates, in a flow diagram, operations for checking the workload priority in accordance with certain embodiments.
Figure 15B:
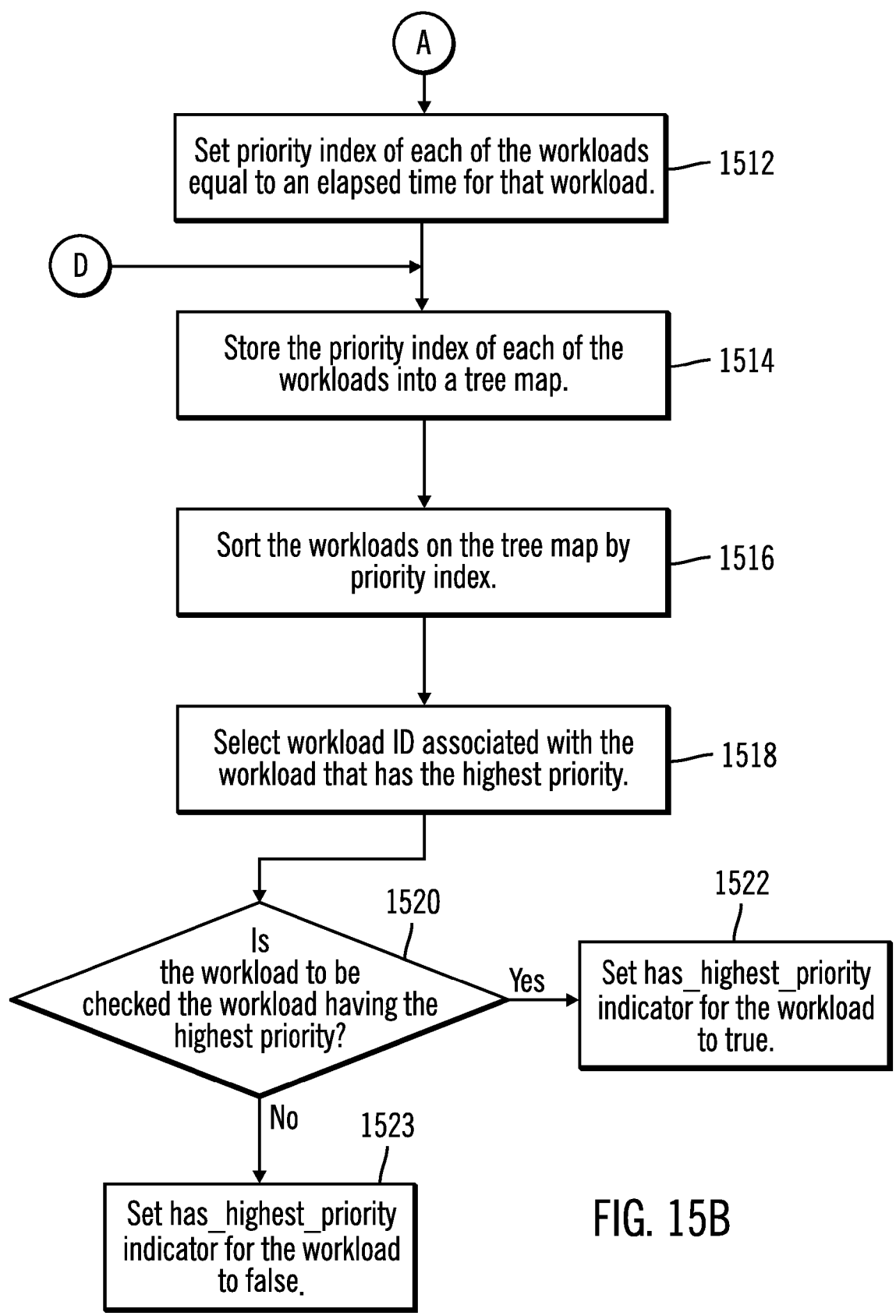
Figure 15C:
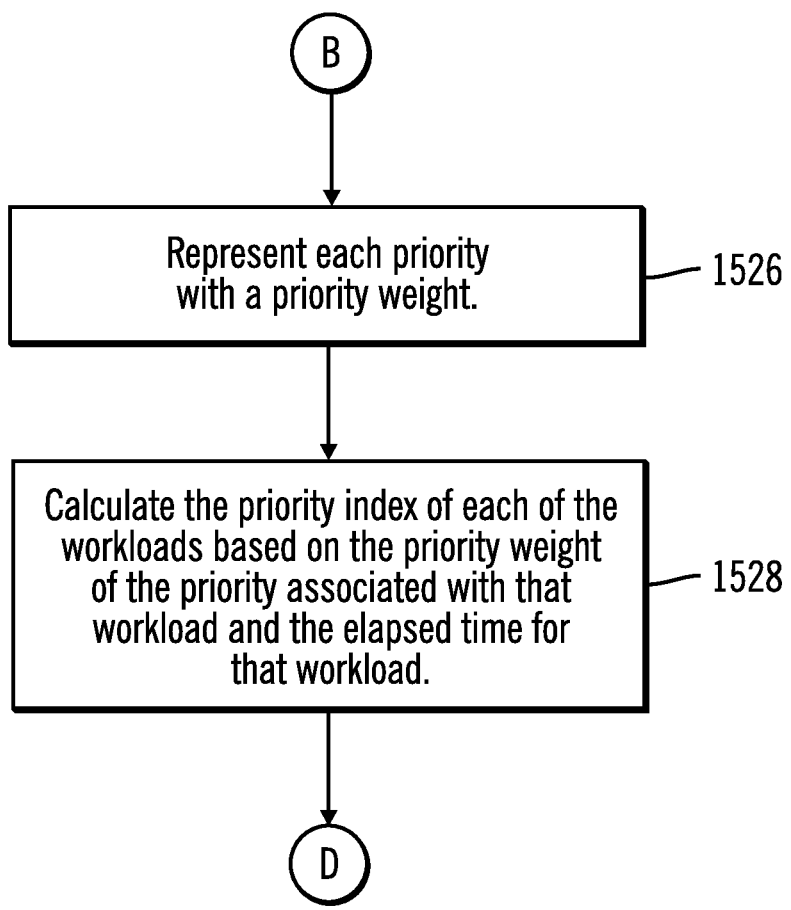
Figure 15D:
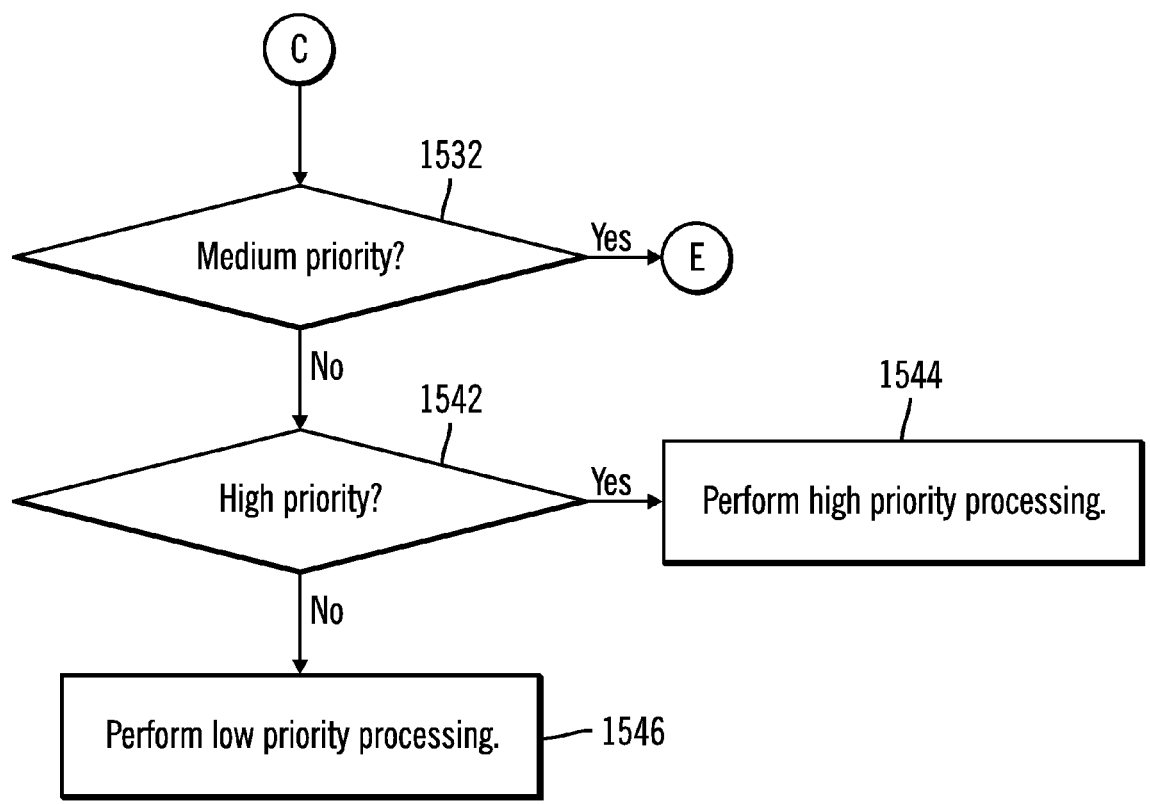
Figure 15E:
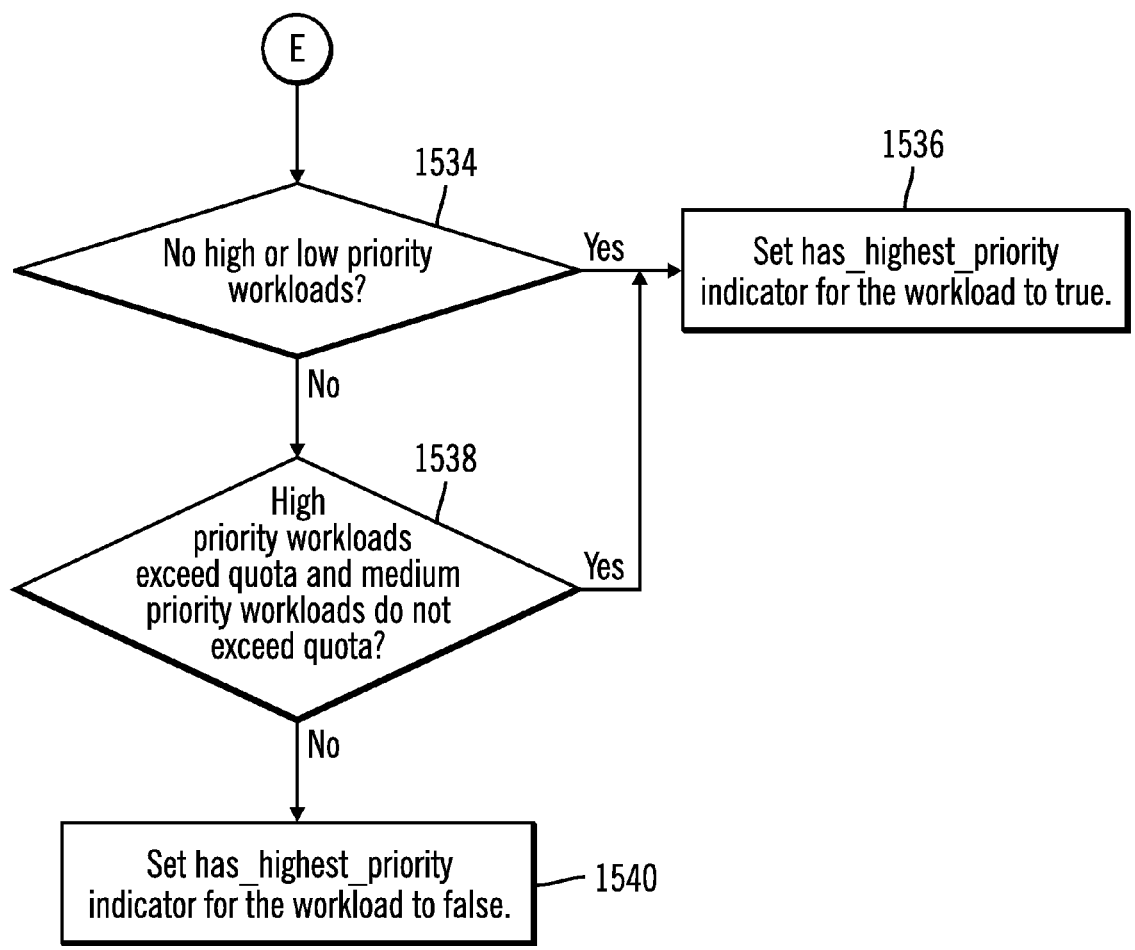

In block 1526, the priority manager 174 represents each priority (e.g., high, medium, low) with a priority weight. In block 1526, the priority manager 174 calculates the priority index of each of the workloads based on the priority weight of the priority associated with that workload and the elapsed time for that workload. From block 1528 (FIG. 15C), processing continues to block 1514 (FIG. 15B).

Returning to FIG. 15A, in block 1530, the priority manager 174 determines whether the workload run ratio rule is to be used to determine priority. If so, processing continues to block 1532 (FIG. 15D), otherwise, processing continues to block 1552.

In block 1532, the priority manager 174 determines whether the workload for which the request was received is of medium priority. If so, processing continues to block 1534 (FIG. 15E), otherwise, processing continues to block 1542. In block 1534, the priority manager 174 determines whether there are no high or low priority workloads. If so, processing continues to block 1536, otherwise, processing continues to block 1538. In block 1536, the priority manager 174 sets a has_highest_priority indicator for the workload to be true.

In block 1538, the priority manager 174 determines whether the high priority workloads exceed the quota for high priority workloads and the medium priority workloads do not exceed the quota for the medium priority workloads. If so, processing continues to block 1536, otherwise, processing continues to block 1540. In block 1540, the priority manager 174 sets a has_highest_priority indicator for the workload to be false.

Returning to FIG. 15D, in block 1542, the

In block 1534, the priority manager 174 priority manager 174 determines whether the workload for which the request was received is of high priority. If so, processing continues to block 1544, otherwise, processing continues to block 1546. In block 1544, the priority manager 174 performs high priority processing. In various embodiments, any type of high priority processing may be performed. In block 1546, the priority manager 174 performs low priority processing. In various embodiments, any type of low priority processing may be performed.

Returning to FIG. 15A, in block 1550, the priority manager 174 performs processing for another priority rule.

Figure 16:
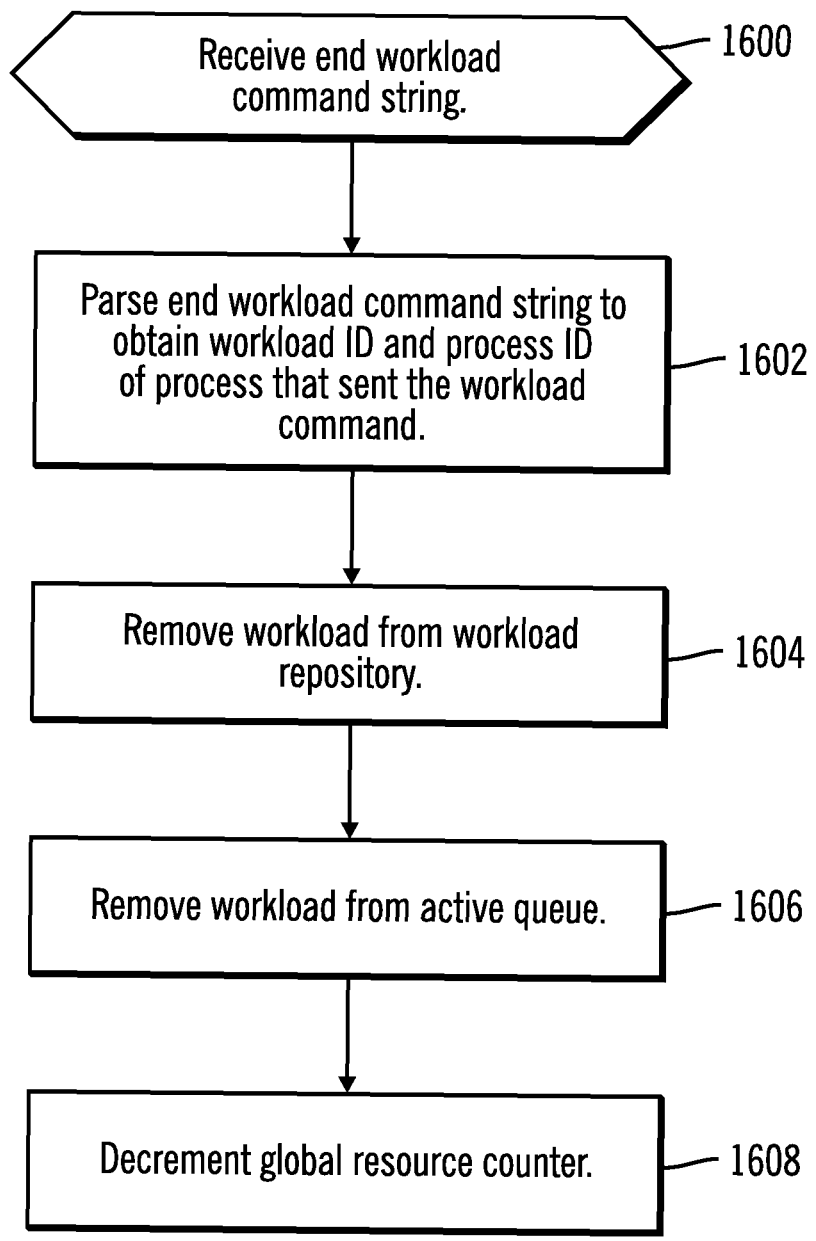
FIG. 16 illustrates, in a flow diagram, operations for processing the end workload command in accordance with certain embodiments.

FIG. 16 illustrates, in a flow diagram, operations for processing the end workload command in accordance with certain embodiments. Control begins at block 1600 with the end workload handler receiving the end workload command string. In block 1602, the end workload handler parses the end workload command string to obtain the workload ID and the process ID of process that sent the workload command. In block 1604, the end workload handler removes the workload from the workload repository 164. In block 1606, the end workload handler removes the workload from the active queue. In block 1608, the end workload handler decrements the global resource counter.

Figure 17A:
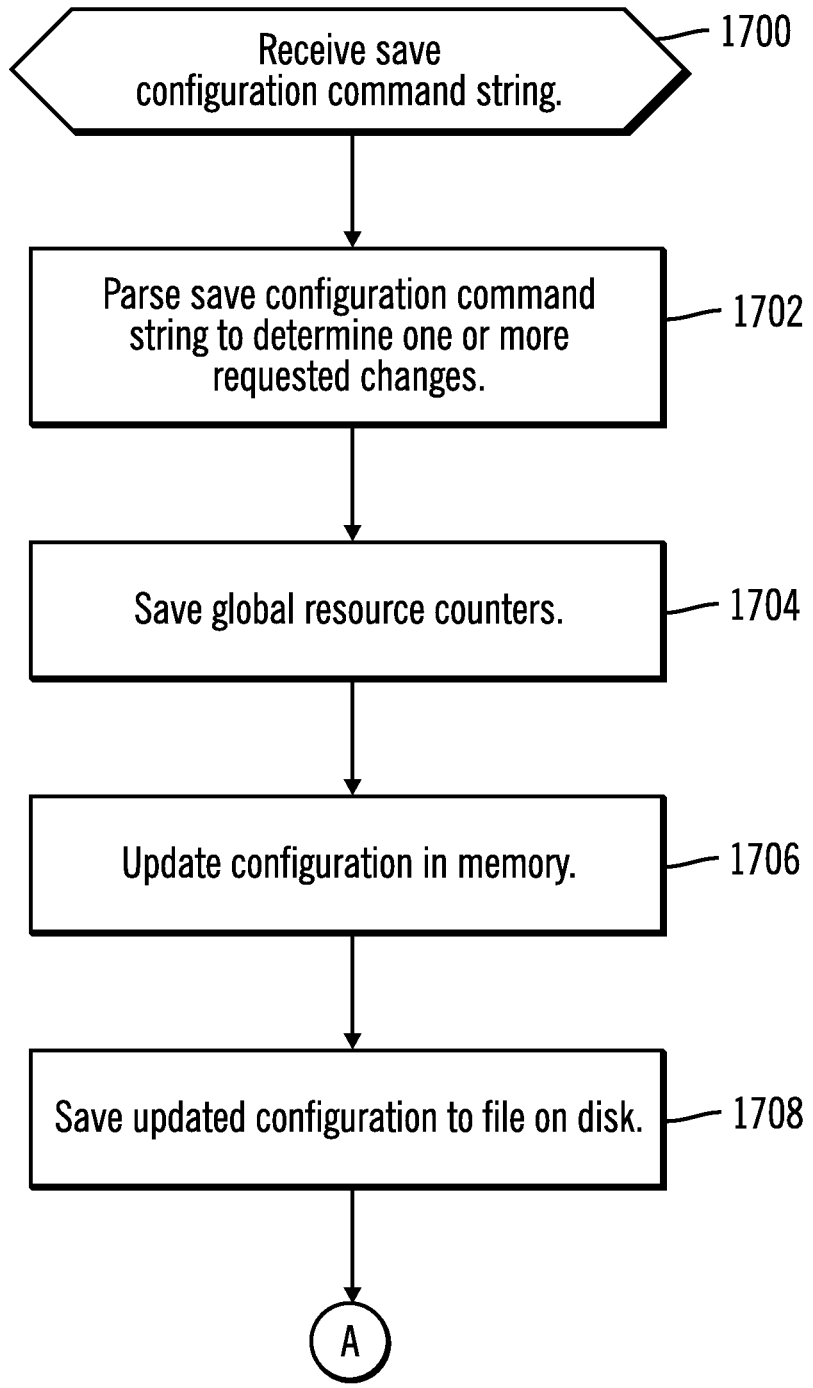
FIG. 17 illustrates, in a flow diagram, operations for processing the save configuration command in accordance with certain embodiments.
Figure 17B:
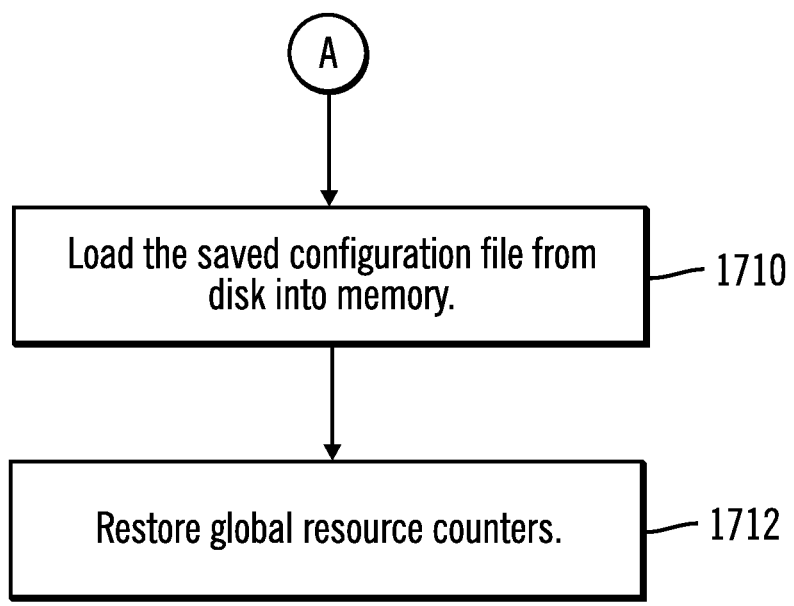

FIG. 17 illustrates, in a flow diagram, operations for processing the save configuration command in accordance with certain embodiments. FIG. 17 is formed by FIG. 17A and FIG. 17B. Control begins at block 1700 with the save configuration handler receiving the save configuration command string. In block 1702, the save configuration handler parses the save configuration command string to determine one or more requested changes. In certain embodiments, the requested changes include, but are not limited to: updating a system resource, updating system parameters, creating a new queue, updating an existing queue, deleting an existing queue, and updating a priority rule.

In block 1704, the save configuration handler saves the global resource counters. In block 1706, the save configuration handler updates the configuration in memory. In block 1708, the save configuration handler saves the updated configuration to file on disk. From block 1708 (FIG. 17A), processing continues to block 1710 (FIG. 17B). In block 1710, the save configuration handler loads the saved configuration file from disk into memory. In block 1712, the save configuration handler restores the global resource counters.

When the configuration changes, there is no need to stop and restart the workload management server 150. The workload management server 150 continues to work with existing workloads with new queue management specifications.

Figure 18:
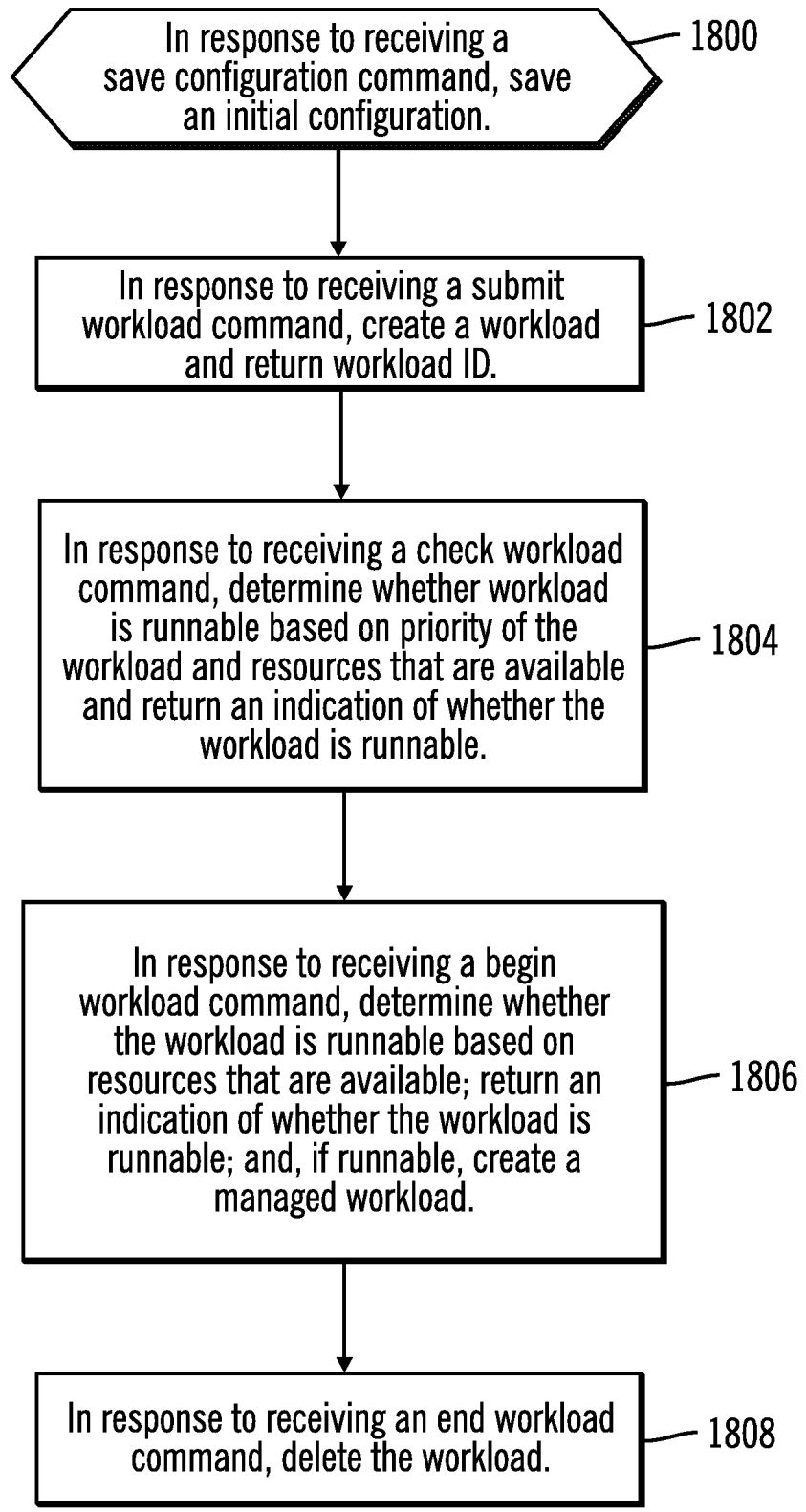
FIG. 18 illustrates, in a flow diagram, operations for processing a workload in accordance with certain embodiments.

FIG. 18 illustrates, in a flow diagram, operations for processing a workload in accordance with certain embodiments. In certain embodiments, a user may issue a save configuration command to save a configuration file and set the initial configuration of the workload management server 150, then, the user may issue a submit command to create a workload, a check workload command to determine whether the workload is ready to be executed, a begin workload command to determine whether the workload is ready to be executed, and, if ready to be executed, to create a managed workload, and an end workload command to delete the workload.

In FIG. 18, control begins at block 1800 with saving an initial configuration in response to receiving a save configuration command. In block 1802, in response to receiving a submit workload command, a workload is created and a workload ID is returned. In block 1804, in response to receiving a check workload command, it is determined whether the workload is runnable based on a priority of the workload and resources that are available for executing the workload and an indication of whether the workload is runnable is returned. In block 1806, in response to receiving a begin workload command, it is determined whether the workload is runnable based on resources that are available, an indication of whether the workload is runnable is returned, and, if runnable, a managed workload is created. In block 1808, in response to receiving an end workload command, the workload is deleted.

When the begin workload command is called and returns an indication that the workload is runnable, the data integration processing engine 100 executes the workload (i.e., performs ETL processing).

FIG. 19 illustrates example command APIs 1900, 1902, 1904, 1906, 1908 that the socket client 120 may send to the workload management server 150 in accordance with certain embodiments. FIG. 19 is formed by FIG. 19A, FIG. 19B, FIG. 19C, FIG. 19D, and FIG. 19E.

FIG. 20 illustrates an example of output 2000, 2002 of the list active command and the list pending command in accordance with certain embodiments. FIG. 20 is formed by FIG. 20A and FIG. 20B. In particular, active workloads 2000 and pending workloads 2002 are illustrated.

Figure 21:
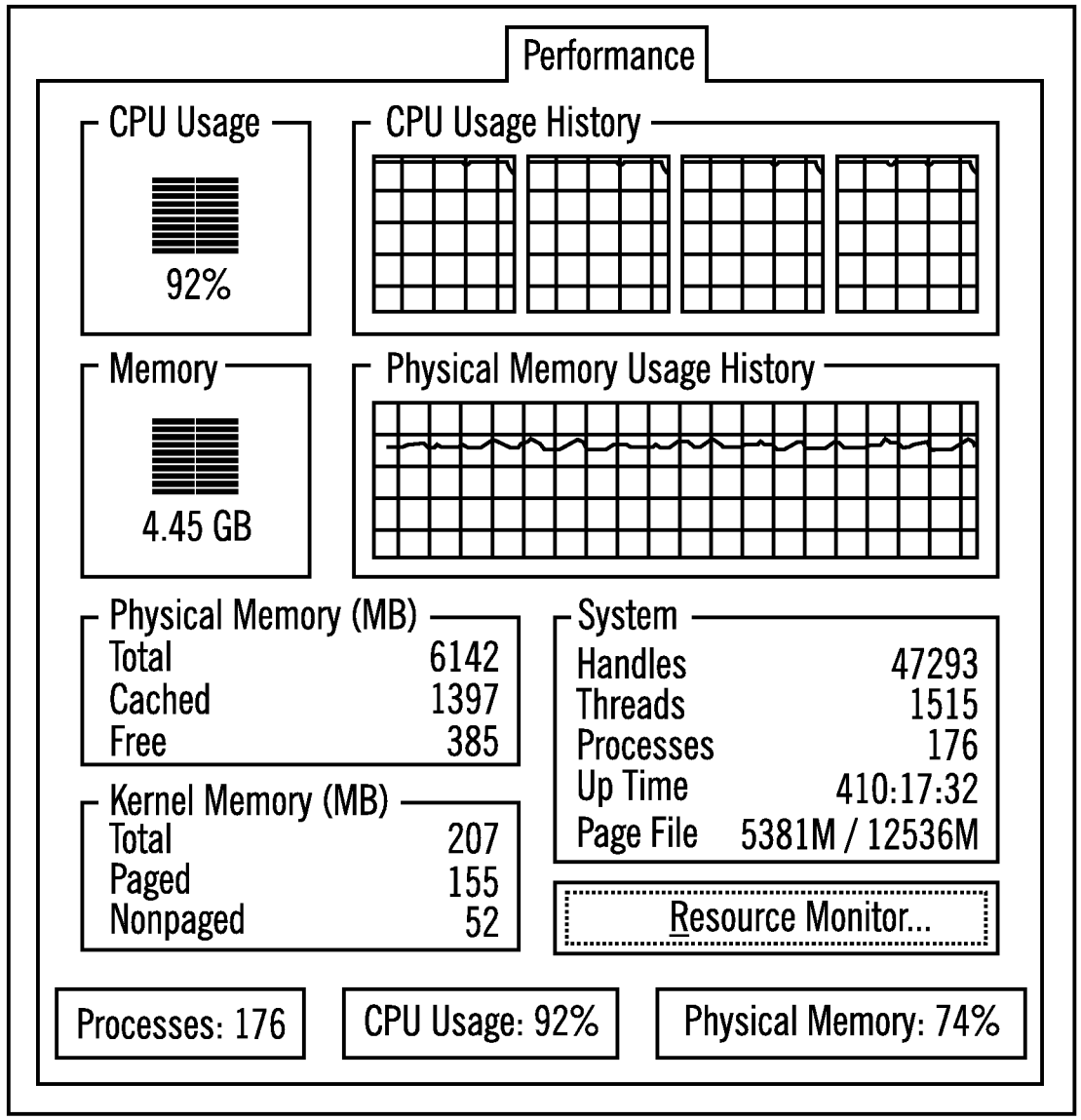
FIG. 21 illustrates Central Processing Unit (CPU) usage and memory usage for the example output of FIG. 20 in accordance with certain embodiments.

FIG. 21 illustrates CPU usage and memory usage for the example output of FIG. 20 in accordance with certain embodiments. For the example referenced in FIG. 20 and FIG. 21, there are 3 workloads being executed, while 4 other workloads are placed in the low priority class queue. At this point, the system CPU is almost maxed out. Because embodiments provide workload execution optimization, embodiments avoid having seven workloads concurrently running and most or all of them failing or hanging because there is not enough system resource to support running seven concurrent data integration workloads.

Embodiments provide the ability to optimize the workload execution so that users can maximize the system throughput and workload success rate. Embodiments provide support for managing and optimizing the workload execution environment to avoid utilization spikes and troughs, frequent workload failures or poor performance due to resource over subscription.

With embodiments, if a particular workload or set of workloads need to be executed, e.g. to meet an Service Level Agreement (SLA), but such execution is being prevented or slowed by an OS level workload manager, a user is able to modify the workload management settings to allow this workload or set of workloads to be executed.

For the data integration environment, embodiments provide a workload management tool with a built-in scheduling capability that allows the user to control when to start a runnable workload.

Thus, embodiments dynamically manage workloads in an ETL system based on physical and logical resources, user-specified run schedules, user-specified priority rules, priorities associated with each workload, and resource availability.

Embodiments not manage the run-time environments of ETL workloads. In particular, embodiments manage system resources for ETL workloads by focusing on run-time resource distribution. With embodiments there are user-specified resource policies and priority rules that focus on how to balance resources among different groups and how to control overall resource utilization on top of all the groups who share the same processing environment, but who are working on different projects at the system level. These are user-specified resource policies and priority rules describe how system resources should be distributed among workloads at run-time.

Embodiments allow the user to control when to actually start a workload after the resources requested have been allocated, how to utilize those resources, and when to release those resources.

With embodiments, physical and logical resources are used to distribute system resources among different groups to help avoid bottlenecks and prevent the system from being overloaded. Logical and physical resources are represented using one resource policy in a two-level hierarchical structure, making it possible to correlate high-level logical resources to low-level physical resources. This approach allows the user to directly work with high-level, easy-to-understand logical resources, while the underlying physical resources are handled automatically by the workload management core 160.

Embodiments are implemented at a data integration application level in an Symmetric Multiprocessing (SMP) data-integration environment. Workload submission and run is controlled by the user, and the workload management core 160 detects whether or not there are enough resources for a given workload. The workload management core 160 then gives the control back to the user to actually start the workload. Because the user has control over when to run a workload, workload scheduling is integrated into the workload management server 150. The workload execution factors include: user-specified run schedules, user-specified priority rules, and available resources.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 22:
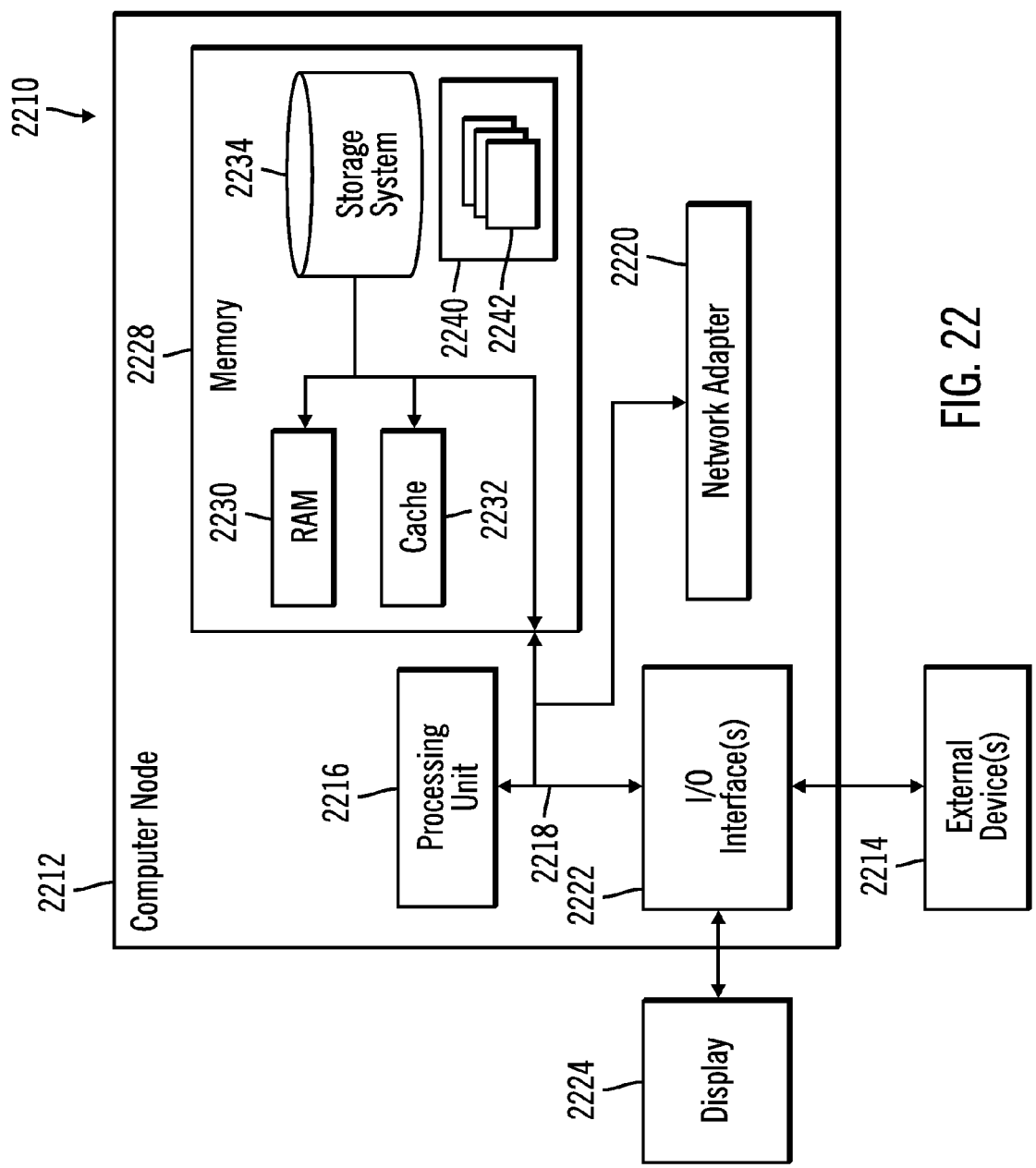
FIG. 22 depicts a cloud computing node in accordance with certain embodiments.

Referring now to FIG. 22, a schematic of an example of a cloud computing node is shown. Cloud computing node 2210 is only one example of a suitable cloud computing node and is not intended to suggest any limitation as to the scope of use or functionality of embodiments of the invention described herein. Regardless, cloud computing node 2210 is capable of being implemented and/or performing any of the functionality set forth hereinabove.

In cloud computing node 2210 there is a computer system/server 2212, which is operational with numerous other general purpose or special purpose computing system environments or configurations. Examples of well-known computing systems, environments, and/or configurations that may be suitable for use with computer system/server 2212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 2212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 2212 in cloud computing node 2210 is shown in the form of a general-purpose computing device. The components of computer system/server 2212 may include, but are not limited to, one or more processors or processing units 2216, a system memory 2228, and a bus 2218 that couples various system components including system memory 2228 to processor 2216.

Bus 2218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2212 typically includes a variety of computer system readable media. Such media may be any available media that is accessible by computer system/server 2212, and it includes both volatile and non-volatile media, removable and non-removable media.

System memory 2228 can include computer system readable media in the form of volatile memory, such as random access memory (RAM) 2230 and/or cache memory 2232. Computer system/server 2212 may further include other removable/non-removable, volatile/non-volatile computer system storage media. By way of example only, storage system 2234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 2218 by one or more data media interfaces. As will be further depicted and described below, memory 2228 may include at least one program product having a set (e.g., at least one) of program modules that are configured to carry out the functions of embodiments of the invention.

Program/utility 2240, having a set (at least one) of program modules 2242, may be stored in memory 2228 by way of example, and not limitation, as well as an operating system, one or more application programs, other program modules, and program data. Each of the operating system, one or more application programs, other program modules, and program data or some combination thereof, may include an implementation of a networking environment. Program modules 2242 generally carry out the functions and/or methodologies of embodiments of the invention as described herein.

Computer system/server 2212 may also communicate with one or more external devices 2214 such as a keyboard, a pointing device, a display 2224, etc.; one or more devices that enable a user to interact with computer system/server 2212; and/or any devices (e.g., network card, modem, etc.) that enable computer system/server 2212 to communicate with one or more other computing devices. Such communication can occur via Input/Output (I/O) interfaces 2222. Still yet, computer system/server 2212 can communicate with one or more networks such as a local area network (LAN), a general wide area network (WAN), and/or a public network (e.g., the Internet) via network adapter 2220. As depicted, network adapter 2220 communicates with the other components of computer system/server 2212 via bus 2218. It should be understood that although not shown, other hardware and/or software components could be used in conjunction with computer system/server 2212. Examples, include, but are not limited to: microcode, device drivers, redundant processing units, external disk drive arrays, RAID systems, tape drives, and data archival storage systems, etc.

Figure 23:
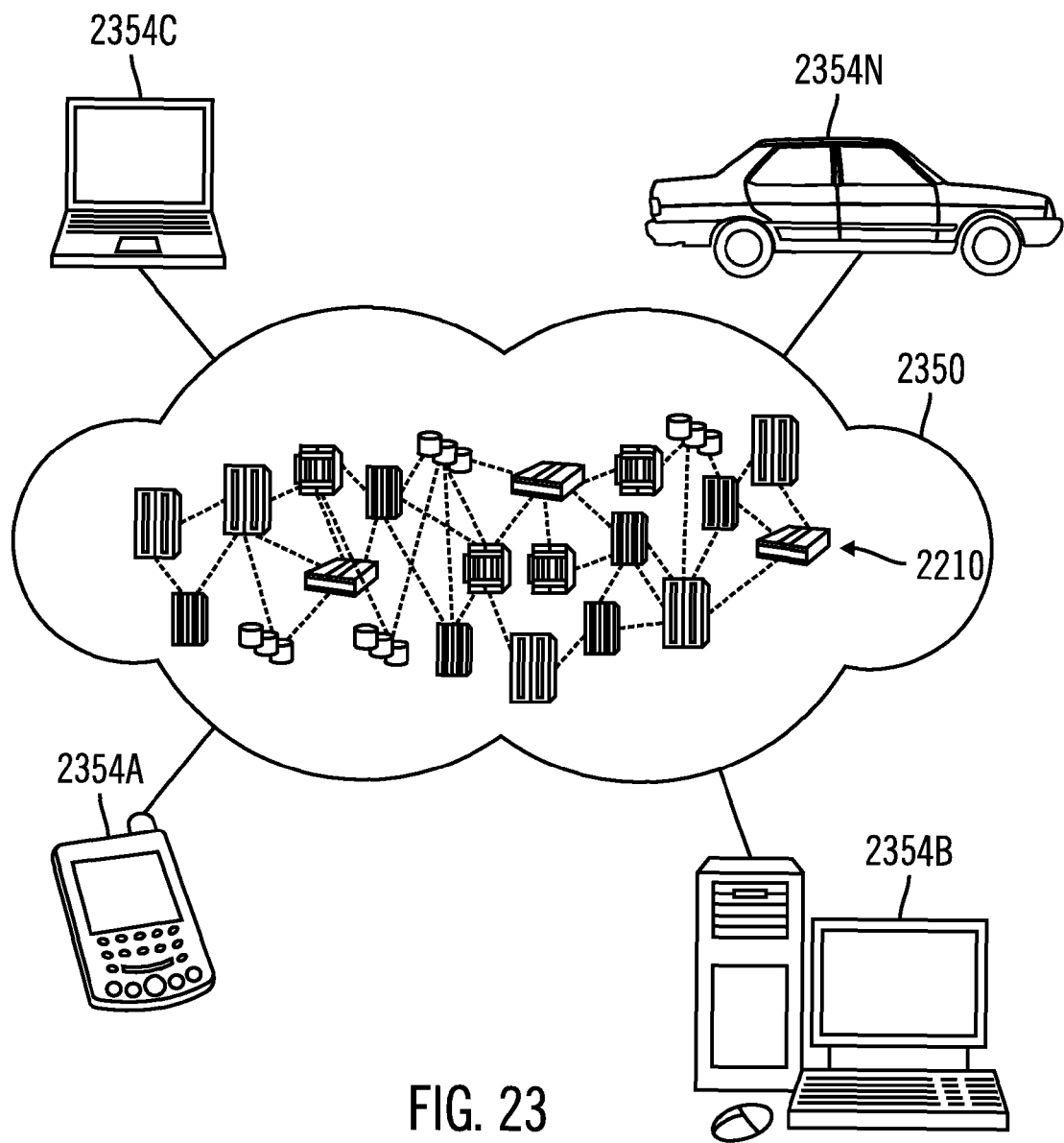
FIG. 23 depicts a cloud computing environment in accordance with certain embodiments.

Referring now to FIG. 23, illustrative cloud computing environment 250 is depicted. As shown, cloud computing environment 250 comprises one or more cloud computing nodes 2210 with which local computing devices used by cloud consumers, such as, for example, personal digital assistant (PDA) or cellular telephone 2354A, desktop computer 2354B, laptop computer 2354C, and/or automobile computer system 2354N may communicate. Nodes 2210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 2354A-N shown in FIG. 23 are intended to be illustrative only and that computing nodes 2210 and cloud computing environment 250 can communicate with any type of computerized device over any type of network and/or network addressable connection (e.g., using a web browser).

Figure 24:
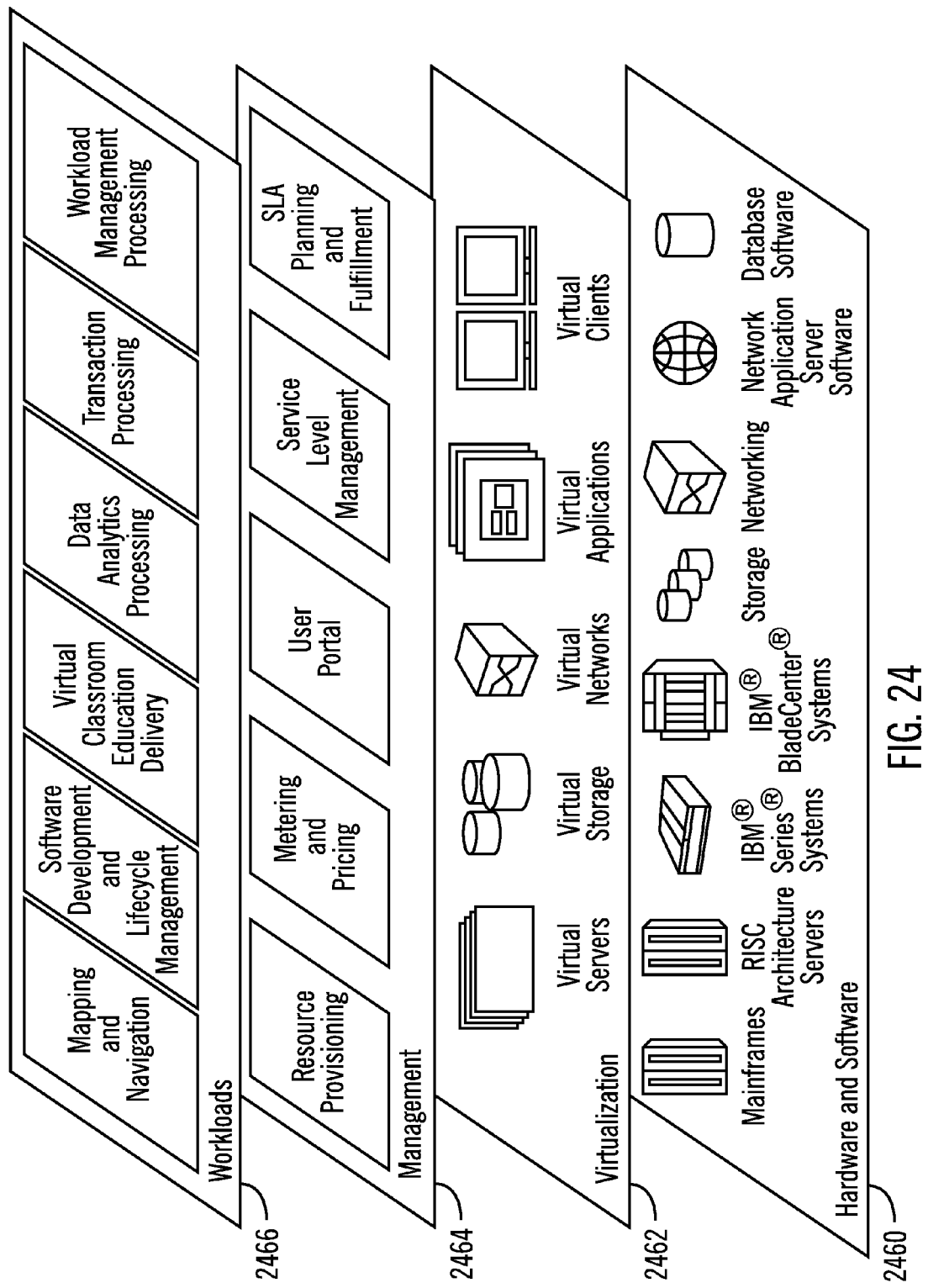
FIG. 24 depicts abstraction model layers in accordance with certain embodiments.

Referring now to FIG. 24, a set of functional abstraction layers provided by cloud computing environment 2350 (FIG. 23) is shown. It should be understood in advance that the components, layers, and functions shown in FIG. 24 are intended to be illustrative only and embodiments of the invention are not limited thereto. As depicted, the following layers and corresponding functions are provided:

Hardware and software layer 2460 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2462 provides an abstraction layer from which the following examples of virtual entities may be provided: virtual servers; virtual storage; virtual networks, including virtual private networks; virtual applications and operating systems; and virtual clients.

In one example, management layer 2464 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 2466 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload management processing.

Thus, in certain embodiments, software or a program, implementing workload management processing in accordance with embodiments described herein, is provided as a service in a cloud environment.

In certain embodiments, the workload management server 150 has the architecture of computing node 2210. In certain embodiments, the workload management server 150 is part of a cloud environment. In certain alternative embodiments, the workload management server 150 is not part of a cloud environment.

In certain embodiments, the a data integration processing engine 100 executes on a node in the cloud environment. In certain alternative embodiments, the a data integration processing engine 100 is not part of the cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for workload management for an Extract, Transform, and Load (ETL) system, comprising:
   determining a priority of each workload in multiple queues using a priority rule and giving a higher priority to a first workload type over a second workload type, wherein each of the multiple queues is associated with a resource policy;
   forming a set of workloads by selecting a first workload from each of the multiple queues;
   selecting a workload from the set of workloads that has a highest priority;
   identifying the resource policy associated with a queue from the multiple queues that had stored the workload;
   identifying an ETL metric at a system level, the ETL metric at a queue level, and at least one physical resource using the identified resource policy; and
   in response to determining that the workload has the highest priority, that the ETL metric at the system level and the ETL metric at the queue level have been met, and that the at least one physical resource is available, determining that the workload is runnable.

2. The method of claim 1, further comprising:
   determining workload execution order based on user-specified scheduling using a submit workload command followed by a check workload command.

3. The method of claim 1, further comprising:
   determining workload execution order based on user-specified scheduling using a begin workload command.

4. The method of claim 1, further comprising:
   defining how another ETL metric is to be shared among workloads.

5. The method of claim 1, wherein the resource policy has a two-level hierarchical representation that defines the ETL metric at the system level, the ETL metric at the queue level, and the at least one physical resource and how the at least one physical resource is distributed among different queues of the multiple queues, wherein the different queues share the resource policy and have different resource distributions.

6. The method of claim 1, wherein the priority rule is selected from a group comprising: an elapsed time rule, a priority weight rule, and a workload run ratio rule.

7. The method of claim 1, further comprising:
   providing an asynchronous queuing mechanism.

8. The method of claim 1, wherein Software as a Service (SaaS) is configured to perform the method operations.

9. A computer system for workload management for an Extract, Transform, and Load (ETL) system, comprising:
   a processor; and
   a storage device connected to the processor, wherein the storage device has stored thereon a program, and wherein the processor is configured to execute instructions of the program to perform operations, wherein the operations comprise:
   determining a priority of each workload in multiple queues using a priority rule and giving a higher priority to a first workload type over a second workload type, wherein each of the multiple queues is associated with a resource policy;
   forming a set of workloads by selecting a first workload from each of the multiple queues;
   selecting a workload from the set of workloads that has a highest priority;
   identifying the resource policy associated with a queue from the multiple queues that had stored the workloads;
   identifying an ETL metric at a system level, the ETL metric at a queue level, and at least one physical resource using the identified resource policy; and
   in response to determining that the workload has the highest priority, that the ETL metric at the system level and the ETL metric at the queue level have been met, and that the at least one physical resource is available, determining that the workload is runnable.

10. The computer system of claim 9, wherein the operations further comprise:
    determining workload execution order based on user-specified scheduling using a submit workload command followed by a check workload command.

11. The computer system of claim 9, wherein the operations further comprise:
    determining workload execution order based on user-specified scheduling using a begin workload command.

12. The computer system of claim 9, wherein the operations further comprise:
    defining how another ETL metric is to be shared among workloads.

13. The computer system of claim 9, wherein the resource policy has a two-level hierarchical representation that defines the ETL metric at the system level, the ETL metric at the queue level, and the at least one physical resource and how the at least one physical resource is distributed among different queues of the multiple queues, wherein the different queues share the resource policy and have different resource distributions.

14. The computer system of claim 9, wherein the priority rule is selected from a group comprising: an elapsed time rule, a priority weight rule, and a workload run ratio rule.

15. The computer system of claim 9, wherein the operations further comprise:
    providing an asynchronous queuing mechanism.

16. The computer system of claim 9, wherein software is provided as a service in a cloud environment.

17. A computer program product for workload management for an Extract, Transform, and Load (ETL) system, the computer program product comprising:
    a non-transitory computer readable storage medium having computer readable program code embodied therewith, wherein the computer readable program code, when executed by a processor of a computer, is configured to perform:
    determining a priority of each workload in multiple queues using a priority rule and giving a higher priority to a first workload type over a second workload type, wherein each of the multiple queues is associated with a resource policy;

forming a set of workloads by selecting a first workload from each of the multiple queues;

selecting a workload from the set of workloads that has a highest priority;

identifying the resource policy associated with a queue from the multiple queues that had stored the workload;

identifying an ETL metric at a system level, the ETL metric at a queue level, and at least one physical resource using the identified resource policy; and in response to determining that the workload has the highest priority, that the ETL metric at the system level and the ETL metric at the queue level have been met, and that the at least one physical resource is available, determining that the workload is runnable.

18. The computer program product of claim 17, wherein the computer readable program code, when executed by a processor of a computer, is configured to perform:

determining workload execution order based on user-specified scheduling using a submit workload command followed by a check workload command.

19. The computer program product of claim 17, wherein the computer readable program code, when executed by a processor of a computer, is configured to perform:

determining workload execution order based on user-specified scheduling using a begin workload command.

20. The computer program product of claim 17, wherein the computer readable program code, when executed by a processor of a computer, is configured to perform:

defining how another ETL metric is to be shared among workloads.

21. The computer program product of claim 17, wherein the resource policy has a two-level hierarchical representation that defines the ETL metric at the system level, the ETL metric at the queue level, and the at least one physical resource and how the at least one physical resource is distributed among different queues of the multiple queues, wherein the different queues share the resource policy and have different resource distributions.

22. The computer program product of claim 17, wherein the priority rule is selected from a group comprising: an elapsed time rule, a priority weight rule, and a workload run ratio rule.

23. The computer program product of claim 17, wherein the computer readable program code, when executed by a processor of a computer, is configured to perform:

providing an asynchronous queuing mechanism.

24. The computer program product of claim 17, wherein software is provided as a service in a cloud environment.

* * * * *